(12) United States Patent
Lee et al.

(10) Patent No.: US 11,256,960 B2
(45) Date of Patent: Feb. 22, 2022

(54) PANOPTIC SEGMENTATION

(71) Applicant: ADOBE INC., San Jose, CA (US)

(72) Inventors: Joonyoung Lee, San Jose, CA (US); Sanghyun Woo, Daejeon (KR); Dahun Kim, Daejeon (KR)

(73) Assignee: ADOBE INC., San Jose, CA (US)

( * ) Notice: Subject to any disclaimer, the term of this patent is extended or adjusted under 35 U.S.C. 154(b) by 58 days.

(21) Appl. No.: 16/849,716

(22) Filed: Apr. 15, 2020

(65) Prior Publication Data

US 2021/0326656 A1 Oct. 21, 2021

(51) Int. Cl.
G06K 9/62 (2006.01)
G06N 3/08 (2006.01)
G06K 9/68 (2006.01)

(52) U.S. Cl.
CPC ......... *G06K 9/6262* (2013.01); *G06K 9/6256* (2013.01); *G06K 9/6857* (2013.01); *G06N 3/08* (2013.01)

(58) Field of Classification Search
None
See application file for complete search history.

(56) References Cited

U.S. PATENT DOCUMENTS

2020/0082219 A1* 3/2020 Li ..................... G06K 9/726
2021/0158043 A1* 5/2021 Hou .................. G06K 9/00664

OTHER PUBLICATIONS

Anurag Arnab, et al., "Pixelwise Instance Segmentation With a Dynamically Instantiated Network", Proc. of Computer Vision and Pattern Recognition (CVPR), pp. 441-450, 2017.
Min Bai, et al., "Deep Watershed Transform for Instance Segmentation", Proc. of Computer Vision and Pattern Recognition (CVPR), 2017, pp. 5221-5229.
Kai Chen, et al., "MMdetection: Open MMLAB Detection Toolbox and Benchmark". arXiv preprint arXiv:1906.07155, 2019, 17 pages.
Liang-Chieh Chen, et al., "Deeplab: Semantic Image Segmentation With Deep Convolutional Nets, Atrous Convolution, and Fully Connected CRFS", IEEE Trans. Pattern Anal. Mach. Intell. (TPAMI), vol. 40, (2017), pp. 834-848.
Liang-Chieh Chen, et al., "Rethinking Atrous Convolution for Semantic Image Segmentation", Proc. of European Conf. on Computer Vision (ECCV), 2018, 14 pages.

(Continued)

*Primary Examiner* — Leon Flores
(74) *Attorney, Agent, or Firm* — F. Chau & Associates, LLC

(57) ABSTRACT

A method, apparatus, non-transitory computer readable medium, and system for panoptic segmentation are described. Embodiments may generate a feature pyramid for an input image, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for the input image based on the enhanced feature pyramid, generate a plurality of object regions based on the enhanced feature pyramid, generate instance information for each of the plurality of object regions, and generate panoptic segmentation information for the input image based on the semantic information and the instance information for each of the plurality of object regions.

20 Claims, 10 Drawing Sheets

(56) References Cited

OTHER PUBLICATIONS

Marius Cordts, et al., "The Cityscapes Dataset for Semantic Urban Scene Understanding", Proc. of Computer Vision and Pattern Recognition (CVPR), 2016, pp. 3213-3223.
Jifeng Dai, et al., "Convolutional Feature Masking for Joint Object and Stuff Segmentation", Proc. of Computer Vision and Pattern Recognition (CVPR), 2015, pp. 3992-4000.
Jifeng Dai, et al., "Instance-Aware Semantic Segmentation Via Multi-Task Network Cascades", Proc. of Computer Vision and Pattern Recognition (CVPR), 2016, pp. 3150-3158.
Jifeng Dai, et al., "Deformable Convolutional Networks" Proc. of Int'l Conf. on Computer Vision (ICCV), 2017, pp. 764-773.
Daan de Geus, et al., "Panoptic Segmentation With a Joint Semantic and Instance Segmentation Network", arXiv preprint arXiv:1809.02110, 2018, 5 pages.
Daan de Geus, et al., "Single Network Panoptic Segmentation for Street Scene Understanding", arXiv preprint arXiv:1902.02678, 2019, 7 pages.
Cheng-Yang Fu, et al., "IMP: Instance Mask Projection for High Accuracy Semantic Segmentation of Things", Proc. of Int'l Conf. on Computer Vision (ICCV), 2019, 10 pages.
Jun Fu, et al., "Dual Attention Network for Scene Segmentation", Proc. of Computer Vision and Pattern Recognition (CVPR), 2019, pp. 3146-3154.
Spyros Gidaris, et al., "Attend Refine Repeat: Active Box Proposal Generation Via In-Out Localization", arXiv preprint arXiv:1606.04446, 2016, 25 pages.
Ross Girshick, "Fast R-CNN", Proc. of Int'l Conf. on Computer Vision (ICCV), 2015, pp. 1440-1448.
Ross Girshick, et al., "Rich Feature Hierarchies for Accurate Object Detection and Semantic Segmentation", Proc. of Computer Vision and Pattern Recognition (CVPR), 2014, pp. 580-587.
Bharath Hariharan, et al., "Simultaneous Detection and Segmentation", Proc. of European Conf. on Computer Vision (ECCV), Springer, 2014, pp. 297-312.
Bharath Hariharan, et al., "Hypercolumns for Object Segmentation and Fine-Grained Localization", Proc. of Computer Vision and Pattern Recognition (CVPR), 2015, pp. 447-456.
Kaiming He, et al., "Mask R-CNN", Proc. of Int'l Conf. on Computer Vision (ICCV), 2017, pp. 2961-2969.
Andrew G Howard, et al., "Mobilenets: Efficient Convolutional Neural Networks for Mobile Vision Applications", arXiv preprint arXiv:1704.04861, 2017, 9 pages.
Jie Hu, Li Shen, et al., Squeeze-and-Excitation Networks, Proc. of Computer Vision and Pattern Recognition (CVPR), 2018, pp. 7132-7141.
Zhaojin Huang, et al., "Mask Scoring R-CNN", Proc. of Computer Vision and Pattern Recognition (CVPR), 2019, pp. 6409-6418.
Ziong Huang, et al., "CCNET: Criss-Cross Attention for Semantic Segmentation", Proc. of Int'l Conf. on Computer Vision (ICCV), 2019, 10 pages.
Forrest N Iandola, et al., "Squeezenet: Alexnet-Level Accuracy With 50X Fewer Parameters and 0.5 MB Model Size" arXiv preprint arXiv:1602.07360, 2016, 13 pages.
Ho-Deok Jang, et al., "Propose-and-Attend Single Shot Detector", arXiv preprint arXiv:1907.12736, 2019, 10 pages.
Alexander Kirillov, et al., "Panoptic Feature Pyramid Networks", Proc. of Computer Vision and Pattern Recognition (CVPR), 2019, pp. 6399-6408.
Alexander Kirillov, et al., "Panoptic Segmentation", Proc. of Computer Vision and Pattern Recognition (CVPR), 2019, pp. 9404-9413.
Alexander Kirillov, et al., "Instancecut: From Edges to Instances With Multicut", Proc. of Computer Vision and Pattern Recognition (CVPR), 2017, pp. 5008-5017.
Huang Lang, et al., "Interlaced Sparse Self-Attention for Semantic Segmentation", arXiv preprint arXiv:1907.12273, 2019, 11 pages.
Justin Lazarow, et al., "Learning Instance Occlusion for Panoptic Segmentation", arXiv preprint arXiv:1906.05896, 2019, 10 pages.
Hongyang Li, et al., "Zoom Out-and-In Network With Map Attention Decision for Region Proposal and Object Detection", Int'l Journal of Computer Vision (IJCV), vol. 127, Springer, 2019, pp. 225-238.
Jie Li, et al., "Learning to Fuse Things and Stuff", arXiv preprint arXiv:1812.01192, 2018, 13 pages.
Qizhu Li, et al., "Weakly-and Semi-Supervised Panoptic Segmentation", Proc. of European Conf. on Computer Vision (ECCV), 2018, pp. 102-118.
Shuai Li, et al., "Dynamic Anchor Feature Selection for Singleshot Object Detection", Proc. of Int'l Conf. on Computer Vision (ICCV), 2019, pp. 6609-6618.
Yanwei Li, et al., "Attention-Guided Unified Network for Panoptic Segmentation", Proc. of Computer Vision and Pattern Recognition (CVPR), 2019, pp. 7026-7035.
Yi Li, et al., "Fully Convolutional Instance-Aware Semantic Segmentation", Proc. of Computer Vision and Pattern Recognition (CVPR), 2017, pp. 2359-2367.
Tsung-Yi Lin, et al., "Feature Pyramid Networks for Object Detection", Proc. of Computer Vision and Pattern Recognition (CVPR), 2017, pp. 2117-2125.
Tsung-Yi Lin, et al., "Focal Loss for Dense Object Detection", Proc. of Int'l Conf. on Computer Vision (ICCV), 2017, pp. 2980-2988.
Tsung-Yi Lin, et al., "Microsoft COCO: Common Objects in Context", Proc. of European Conf. on Computer Vision (ECCV), Springer 2014, pp. 740-755.
Huanyu Liu, et al., "An End-to-End Network for Panoptic Segmentation", Proc. of Computer Vision and Pattern Recognition (CVPR), 2019, pp. 6172-6181.
Shu Liu, et al., "SGN: Sequential Grouping Networks for Instance Segmentation", Proc. of Int'l Conf. on Computer Vision (ICCV), 2017, pp. 3496-3504.
Shu Liu, et al., "Path Aggregation Network for Instance Segmentation", Proc. of Computer Vision and Pattern Recognition (CVPR), 2018, pp. 8759-8768.
Jonathan Long, et al., "Fully Convolutional Networks for Semantic Segmentation", Proc. of Computer Vision and Pattern Recognition (CVPR), 2015, pp. 3431-3440.
Hsueh-Fu Lu, et al., "Toward Scaleinvariance and Position-Sensitive Region Proposal Networks", Proc. of European Conf. on Computer Vision (ECCV), 2018, pp. 168-183.
Hyeonwoo Noh, et al., "Learning Deconvolution Network for Semantic Segmentation", Proc. of Int'l Conf. on Computer Vision (ICCV), 2015, pp. 1520-1528.
Jiangmiao Pang, et al., "Libra R-CNN: Towards Balanced Learning for Object Detection", Proc. of Computer Vision and Pattern Recognition (CVPR), 2019, pp. 821-830.
Adam Paszke, et al., "Automatic Differentiation in Pytorch", 2017, 4 pages.
Pedro O Pinheiro, et al., "Learning to Segment Object Candidates", Proc. of Neural Information Processing Systems (NeurIPS), 2015, pp. 1990-1998.
Pedro O Pinheiro, et al., "Learning to Refine Object Segments", Proc. of European Con. on Computer Vision (ECCV), Springer, 2016, pp. 75-91.
Lorenzo Porzi, et al., "Seamless Scene Segmentation", Proc. of Computer Vision and Pattern Recognition (CVPR), 2019, pp. 8277-8286.
Shaoqing Ren, et al., "Faster R-CNN: Towards Real-Time Object Detection With Region Proposal Networks", Proc. of Neural Information Processing Systems (NeurIPS), 2015, pp. 91-99.
Olaf Ronneberger, et al., "U-NET: Convolutional Networks for Biomedical Image Segmentation", International Conference on Medical image computing and computer-assisted intervention, Springer, 2015, pp. 234-241.
Peter Shaw, et al., "Selfattention With Relative Position Representations", arXiv preprint arXiv:1803.02155, 2018, 5 pages.
Konstantin Sofiiuk et al., "Adaptis: Adaptive Instance Selection Network", Proc. of Int'l Conf. on Computer Vision (ICCV), 2019, pp. 7355-7363.
Ashish Vaswani, et al., "Attention is All You Need", Proc. of Neural Information Processing Systems (NeurIPS), 2017, pp. 5998-6008.

(56) References Cited

OTHER PUBLICATIONS

Thang Vu, et al., "Cascade RPN: Delving Into High-Quality Region Proposal Network With Adaptive Convolution", Proc. of Neural Information Processing Systems (NeurIPS), 2019, 11 pages.
Jiaqi Wang, et al., "Region Proposal by Guided Anchoring", Proc. of Computer Vision and Pattern Recognition (CVPR), 2019, pp. 2965-2974.
Xiaolongwang, et al., "Non-Local Neural Networks", Proc. of Computer Vision and Pattern Recognition (CVPR), 2018, pp. 7794-7803.
Yue Wu, et al., "Rethinking Classification and Localization in R-CNN", arXiv preprint arXiv:1904.06493, 2019, 13 pages.
Yuwen Xiong, et al., "UPSNET: A Unified Panoptic Segmentation Network", Proc. of Computer Vision and Pattern Recognition (CVPR), 2019, pp. 8818-8826.
Tien-Ju Yang, et al., "Deeperlab: Single-Shot Image Parser", Proc. of Computer Vision and Pattern Recognition (CVPR), 2019, 20 pages.
Fisher Yu, et al., "Deep Layer Aggregation", Proc. of Computer Vision and Pattern Recognition (CVPR), 2018, pp. 2403-2412.
Hang Zhang, et al., "Context Encoding for Semantic Segmentation", Proc. of Computer Vision and Pattern Recognition (CVPR), 2018, pp. 7151-7160.
Hang Zhang, et al., "CO-Occurrent Features in Semantic Segmentation", Proc. of Computer Vision and Pattern Recognition (CVPR), 2019, pp. 548-557.
Hengshuang Zhao, et al. "Pyramid Scene Parsing Network", Proc. of Computer Vision and Pattern Recognition (CVPR), 2017, pp. 2881-2890.
Xizhou Zhu, et al, "Deformable Convnets V2: More Deformable, Better Results", Proc. of Computer Vision and Pattern Recognition (CVPR), 2019, pp. 9308-9316.
Zhen Zhu, et al., "Asymmetric Non-Local Neural Networks for Semantic Segmentation", Proc. of Int'l Conf. on Computer Vision (ICCV), 2019, pp. 593-602.
Adam Paszke, et al., "Automatic Differentiation in Pytorch", NIPS Autodiff Workshop, 2017, 4 pages.
Alexander Kirillov, et al., "Panoptic Feature Pyramid Networks", Proceedings of the IEEE Conference on Computer Vision and Pattern Recognition, pp. 6399-6408, 2019.
Alexander Kirillov, et al., "Panoptic Segmentation", Proceedings of the IEEE Conference on Computer Vision and Pattern Recognition, pp. 9404-9413, 2019.
Bolei Zhou, et al., "Semantic Understanding of Scenes Through the ADE20K Dataset", International Journal of Computer Vision, 127(3):302-321, 2019.
Cheng-Yang Fu, et al., "IMP: Instance Mask Projection for High Accuracy Semantic Segmentation of Things", 2019, 10 pages.
Christoph Feichtenhofer, et al., "Detect to Track and Track to Detect", Proceedings of the IEEE International Conference on Computer Vision, pp. 3038-3046, 2017.
Eddy Ilg et al., "Flownet 2.0: Evolution of Optical Flow Estimation With Deep Networks", Proceedings of the IEEE conference on computer vision and pattern recognition, pp. 2462-2470, 2017.
Evan Shelhamer, et al., "Clockwork Convnets for Video Semantic Segmentation", European Conference on Computer Vision, pp. 852-868. Springer, 2016.
Federico Perazzi, et al., "Learning Video Object Segmentation From Static Images", Proceedings of the IEEE Conference on Computer Vision and Pattern Recognition, pp. 2663-2672, 2017.
Gerhard Neuhold, et al., "The Mapillary Vistas Dataset for Semantic Understanding of Street Scenes", Proceedings of the IEEE International Conference on Computer Vision, pp. 4990-4999, 2017.
Jiangmiao Pang, et al., "Libra R-CNN: Towards Balanced Learning for Object Detection", Proceedings of the IEEE Conference on Computer Vision and Pattern Recognition, pp. 821-830, 2019.
Jifeng Dai, et al, "Deformable Convolutional Networks", pp. 764-773, 2017.

Jingchun Cheng, et al., "Segflow: Joint Learning for Video Object Segmentation and Optical Flow", Proceedings of the IEEE international conference on computer vision, pp. 686-695, 2017.
Kai Chen, et al., "MMdetection: Open MMlab Detection Toolbox and Benchmark", arXiv preprint arXiv:1906.07155, 2019, 13 pages.
Kaiming He, et al., "Deep Residual Learning for Image Recognition", Proceedings of the IEEE conference on computer vision and pattern recognition, pp. 770-778, 2016.
Kaiming He, et al., "Mask R-CNN", Proceedings of the IEEE international conference on computer vision, pp. 2961-2969, 2017.
Konstantin Sofiiuk, et al., "Adaptis: Adaptive Instance Selection Network", Proceedings of the IEEE International Conference on Computer Vision, pp. 7355-7363, 2019.
Linjie Yang, et al., "Efficient Video Object Segmentation Via Network Modulation", Proceedings of the IEEE Conference on Computer Vision and Pattern Recognition, pp. 6499-6507, 2018.
Linjie Yang, et al., "Video Instance Segmentation", arXiv preprint arXiv:1905.04804, 2019, 10 pages.
Lorenzo Porzi, et al., "Seamless Scene Segmentation", Proceedings of the IEEE Conference on Computer Vision and Pattern Recognition, pp. 8277-8286, 2019.
Marius Cordts, et al., "The Cityscapes Dataset for Semantic Urban Scene Understanding", Proc. of the IEEE Conference on Computer Vision and Pattern Recognition (CVPR), 2016, 11 pages.
Pavel Tokmakov, et al., "Learning Video Object Segmentation With Visual Memory", Proceedings of the IEEE International Conference on Computer Vision, pp. 4481-4490, 2017.
Qizhu Li, et al., "Weakly and Semi-Supervised Panoptic Segmentation", Proceedings of the European Conference on Computer Vision (ECCV), pp. 102-118, 2018.
Seoung Wug Oh, et al., "Fast Video Object Segmentation by Reference-Guided Mask Propagation", Proceedings of the IEEE Conference on Computer Vision and Pattern Recognition, pp. 7376-7385, 2018.
Seoung Wug Oh, et al., "Video Object Segmentation Using Space-Time Memory Networks", arXiv preprint arXiv:1904.00607, 2019, 10 pages.
Sergi Caelles, et al., "One-Shot Video Object Segmentation", Proceedings of the IEEE conference on computer vision and pattern recognition, pp. 221-230, 2017.
Stephan R Richter, et al., "Playing for Benchmarks", Proceedings of the IEEE International Conference on Computer Vision, pp. 2213-2222, 2017.
Tien-Ju Yang, et al., "Deeperlab: Single-Shot Image Parser", arXiv preprint arXiv:1902.05093, 2019, 20 pages.
Tsung-Yi Lin, et al., "Feature Pyramid Networks for Object Detection", pp. 2117-2125, 2017.
Tsung-Yi Lin, et al., "Microsoft COCO: Common Objects in Context", pp. 740-755. Springer, 2014.
Xizhou Zhu, et al., "Deep Feature Flow for Video Recognition", Proceedings of the IEEE Conference on Computer Vision and Pattern Recognition, pp. 2349-2358, 2017.
Xizhou Zhu, et al., "Flow-Guided Feature Aggregation for Video Object Detection", Proceedings of the IEEE International Conference on Computer Vision, pp. 408-417, 2017.
Yanwei Li, et al., "Attention-Guided Unified Network for Panoptic Segmentation", Proceedings of the IEEE Conference on Computer Vision and Pattern Recognition, pp. 7026-7035, 2019.
Yuhua Chen, et al, Blazingly Fast Video Object Segmentation With Pixel-Wise Metric Learning, Proceedings of the IEEE Conference on Computer Vision and Pattern Recognition, pp. 1189-1198, 2018.
Yule Li, et al., "Low-Latency Video Semantic Segmentation", Proceedings of the IEEE Conference on Computer Vision and Pattern Recognition, pp. 5997-6005, 2018.
Yuwen Xiong, et al., "UPSNET: A Unified Panoptic Segmentation Network", Proceedings of the IEEE Conference on Computer Vision and Pattern Recognition, pp. 8818-8826, 2019.

* cited by examiner

PANOPTIC SEGMENTATION

BACKGROUND

The following relates generally to image processing, and more specifically to panoptic segmentation.

In some cases, computer vision tasks such as recognition, object classification, detection and segmentation may be unified into a single comprehensive task to leverage possible complementarity. For example, semantic segmentation may be a task for detecting all pixels in a scene, and instance segmentation may be a task to delineate objects in defined classes. "Panoptic Segmentation" involves both semantic segmentation and instance segmentation to detect and delineate every visible object and region in the scene.

In some cases, panoptic segmentation may be performed using a network trained for individual tasks, and the results can then be combined using heuristic algorithms. However, this approach can be computationally inefficient and may not capture the complementarity of instance and semantic information. Therefore, there is a need in the art for improved systems and methods of panoptic segmentation.

SUMMARY

A method, apparatus, non-transitory computer readable medium, and system for panoptic segmentation are described. Embodiments of the method, apparatus, non-transitory computer readable medium, and system may generate a feature pyramid for an input image, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for the input image based on the enhanced feature pyramid, generate a plurality of object regions based on the enhanced feature pyramid, generate instance information for each of the plurality of object regions, and generate panoptic segmentation information for the input image based on the semantic information and the instance information for each of the plurality of object regions.

A method, apparatus, non-transitory computer readable medium, and system for training an artificial neural network (ANN) for panoptic segmentation are described. Embodiments of the method, apparatus, non-transitory computer readable medium, and system may identify training data comprising a plurality of input images and panoptic segmentation information for each of the plurality of input images, generate a feature pyramid for each of the plurality of input images, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for each of the plurality of input images based on the enhanced feature pyramid, generate instance information for each of the plurality of input images based on the enhanced feature pyramid, generate predicted panoptic segmentation information for each of the plurality of input images based on the semantic information and the instance information, compare the predicted panoptic segmentation information to the panoptic segmentation information for each of the plurality of input images, and update the ANN based on the comparison.

An apparatus, system, and method for panoptic segmentation are described. Embodiments of the apparatus, system, and method may include a feature pyramid component comprising a feature pyramid network and an attention module, wherein the feature pyramid component is configured to produce an enhanced feature pyramid based on the attention module, an instance component comprising an region proposal network (RPN) and an instance head, wherein the instance component is configured to generate instance information based on the enhanced feature pyramid, and a semantic component configured to generate semantic information based on the enhanced feature pyramid, wherein panoptic segmentation information is generated based on the instance information and the semantic information.

DETAILED DESCRIPTION

Embodiments of the present disclosure relate to improved systems and methods for panoptic segmentation. Panoptic segmentation includes the combined tasks of segmenting foreground object instances and background regions in an image. Foreground objects are sometimes referred to as "things" whereas background regions are referred to as "stuff".

Figure 1:
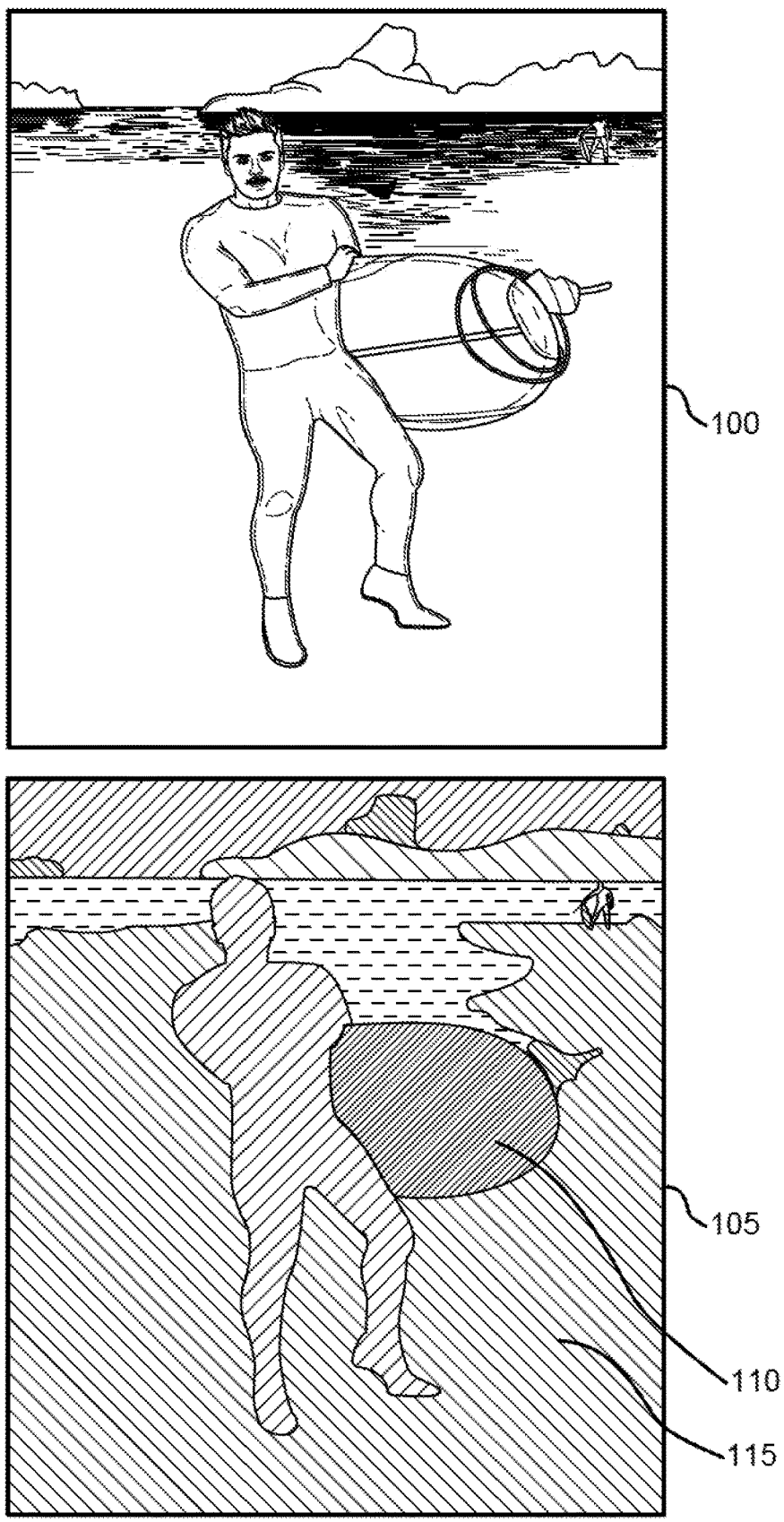
FIG. 1 shows an example of panoptic segmentation according to aspects of the present disclosure.

As a combination of two tasks, panoptic segmentation may parse a whole image for both thing and stuff classes, and separate different thing instances from each other. An example of panoptic segmentation information is illustrated by FIG. 1, in which men with surfboards are distinguished from a background including a beach and the ocean. Panoptic segmentation may be particularly useful for dense scene understanding (i.e., understanding scenes with many different things and different kinds of stuff).

Conventionally, panoptic segmentation is accomplished by performing the two tasks separately, and then combining the information into a single set of annotation information. However, this technique does not take into account complementary interactions between the semantic segmentation and instance segmentation information. For example, there may be relationships between the categorization of foreground things and background stuff (e.g., between the sand on the beach and the surfboard). Thus, conventional systems may mis-categorize some of the things or stuff.

Thus, embodiments of the present disclosure provide a unified network that simultaneously generates region-based outputs for instance segmentation and pixel-based outputs for semantic segmentation. A high level of accuracy is achieved for both tasks.

Some embodiments of a panoptic segmentation network may be based on a panoptic feature pyramid network (FPN) structure, which includes a Mask region convolution neural network (R-CNN) framework and a semantic segmentation branch. Specifically, a panoptic FPN architecture may be divided into four parts: a feature extraction "neck" used for both instance and semantic segmentation, a region proposal network (RPN), an instance head, and a semantic head. Connecting these components results in a unified network that achieves a high level of Panoptic Quality (PQ) on multiple benchmarks.

The following terms are used throughout the present disclosure:

The term "panoptic segmentation information" refers to the combination of instance segmentation information and semantic segmentation information. Panoptic segmentation is well suited for image processing and for use such as in a computer vision task.

The term "prediction panoptic segmentation information" refers to panoptic segmentation information that is output from a neural network (as opposed to ground truth panoptic segmentation information which can be used to train the network).

The term "feature pyramid" refers to a feature extraction network that produces feature maps at several different resolution levels.

The term "attention module" refers to a network component that places differing levels of importance on different input values using learned parameters multiplied by query and key vectors obtained from the input.

The term "semantic information" refers to the semantic classification of different pixels of an image. For example, each pixel may be associated with one or more values representing the likelihood that the pixel corresponds to one of a set of background (i.e., stuff) classes present in the image.

The term "object region" refers to a proposed bounding box for an object instance in an image. An object region may be further processed to provide instance information corresponding to a foreground object (i.e., a thing).

The term "instance information" refers to the identification of object boundaries in an image. For example, each object (including background textures) in an image may be associated with an object mask within an object region that identifies the limits of the object.

Panoptic Segmentation

FIG. 1 shows an example of panoptic segmentation according to aspects of the present disclosure. The example shown includes original image 100 and annotated image 105. Annotated image 105 may include panoptic segmentation information indicating foreground objects 110 (e.g., a man and a surfboard) and background regions 115 (e.g., sand or water).

The panoptic segmentation task provides a unified result for the foreground "things" and the background "stuff" (i.e., via instance segmentation and semantic segmentation). A baseline panoptic segmentation network may involve training the two sub-tasks separately and then fusing the results by heuristic rules. According to the present disclosure, a unified end-to-end learning method may be used to train a panoptic segmentation network. For example, a network may transfer complementary information from the instance head to the semantic head via an attention module.

An instance segmentation task focuses on identifying 'things' in an image. Specifically, the task includes identifying both the semantic class and instance id of each foreground object. Instance segmentation methods can be categorized into two groups: segmentation-based and region-based methods. Segmentation-based methods produce a semantic segmentation map and then attempt to divide the pixels of each category into different instances. Region-based methods may be based on a two-step R-CNN framework. Specifically, region-based methods may first generate region proposals and then predict instance masks.

A semantic segmentation task identifies different kinds of 'stuff' in an image based on, for example, a neural network such as a fully convolutional neural network. Semantic segmentation may also capture and utilize contextual information. Low-level and high-level semantic features may be fused to utilize different scale contexts. For example, stacking dilated convolutions may enlarge the receptive field while preserving the resolution. A deformable convolution may then generalize the dilated convolution. In some cases, a channel attention mechanism may be used to capture the global context. Additionally, adaptive context may be captured based on non-local pixel-wise relations.

In some examples, an objective function may be used to enforce thing and stuff consistency. In another example, a spatial ranking module may be used to address occlusion between the predicted instances. In another example, a parameter-free panoptic head may be used to resolve conflicts between thing and stuff segmentation. In some cases, a panoptic segmentation network may be based on a panoptic FPN structure.

System Overview

Figure 2:
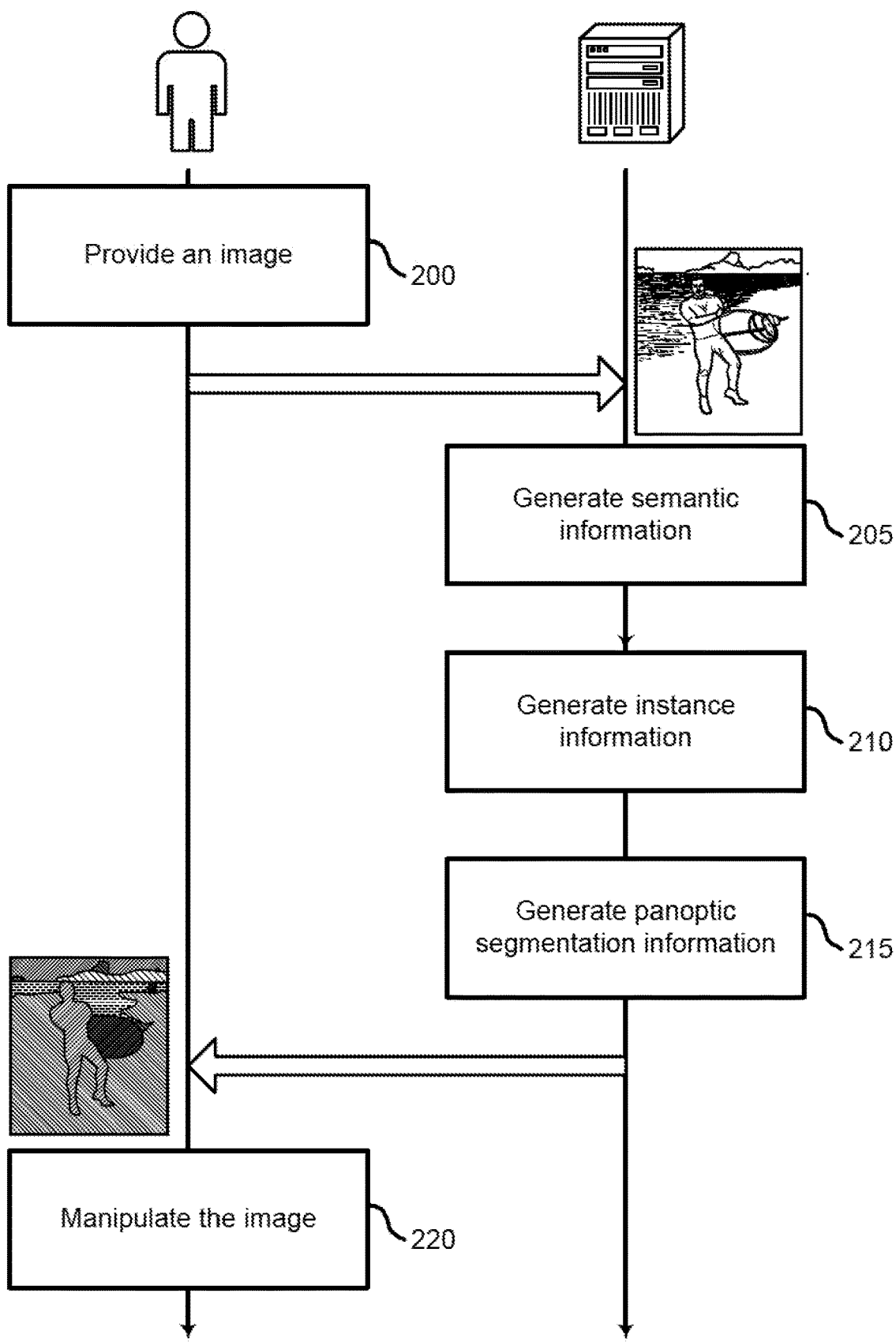
FIG. 2 shows an example of a process for panoptic segmentation according to aspects of the present disclosure.

FIG. 2 shows an example of a process for panoptic segmentation according to aspects of the present disclosure. In some examples, these operations may be performed by a system including a user and a computing system having a processor executing a set of codes to control functional elements of an apparatus.

At operation 200, the user provides an image. For example, the user may provide the original image 100 shown in FIG. 1.

At operation 205, the computing system generates semantic information. The semantic information may differentiate between foreground things and background stuff for each pixel in the original image (e.g., by identifying stuff classes such as person, sand or water). In some cases, the operations of this step may refer to, or be performed by, a semantic component as described with reference to FIG. 4.

At operation 210, the computing system generates instance information. The instance image may differentiate between different foreground objects (e.g., by identifying different instances of people and surfboards). In some cases, the operations of this step may refer to, or be performed by, an instance component as described with reference to FIG. 4.

At operation 215, the computing system generates panoptic segmentation information. For example, the panoptic segmentation information may be in the form of one or more image masks indicating pixels associated with different foreground and background classes. In some cases, the operations of this step may refer to, or be performed by, a panoptic segmentation component as described with reference to FIG. 3.

At operation 220, the user manipulates the image based on the panoptic segmentation information. For example, the user may select pixels associated with a particular person and change the skin tone, or change the color of the surfboard.

Figure 3:
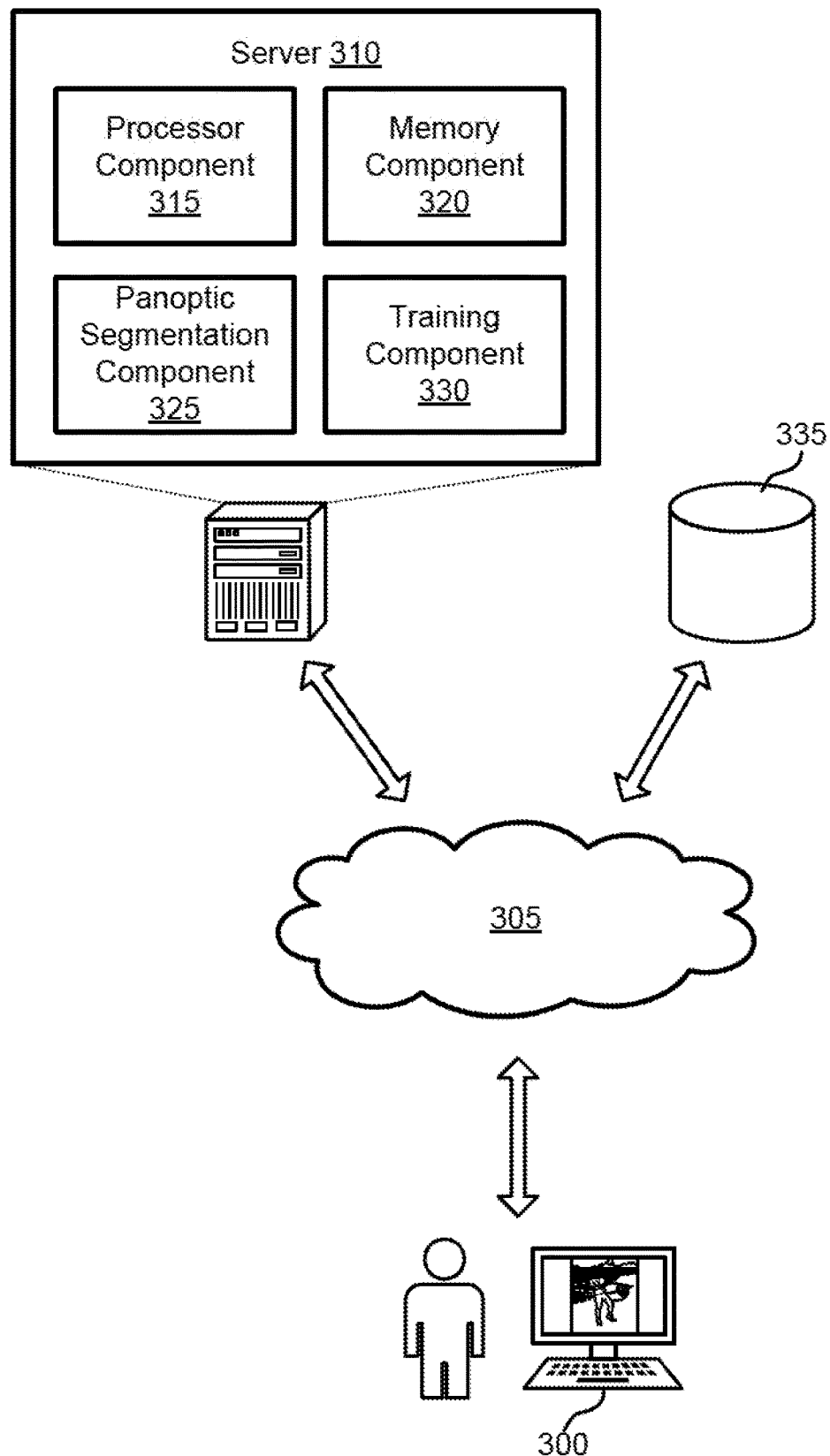
FIG. 3 shows an example of a system for panoptic segmentation according to aspects of the present disclosure.

FIG. 3 shows an example of a system for panoptic segmentation according to aspects of the present disclosure. The example shown includes user terminal 300, communications network 305, server 310, and database 335. In some examples, the server includes an artificial neural network (ANN) for performing panoptic segmentation. However, in other examples, the panoptic segmentation may be performed locally, e.g., at the user terminal 300.

Server 310 may include processor component 315, memory component 320, panoptic segmentation component 325, and training component 330.

A processor component 315 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions.

A memory component 320 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Panoptic segmentation component 325 generates panoptic segmentation information for the input image based on semantic information and instance information for each of the set of object regions. For example, panoptic segmentation component 325 may generate predicted panoptic segmentation information for each of a set of input images based on the semantic information and the instance information for each of a set of object regions.

In some cases, panoptic segmentation may be performed by an architecture known as a panoptic feature pyramid network (FPN), which includes a convolutional neural network (CNN) combined with a semantic segmentation branch. A Panoptic FPN architecture can be divided into four components: a feature extraction "neck", a region proposal network (RPN), an instance head, and a semantic head.

Panoptic segmentation component 325 may be implemented as an ANN). An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some cases, a standard CNN may not be suitable (e.g., when the length of the output layer is variable, or when the number of the objects of interest is not fixed). Furthermore, the objects of interest (i.e., the chart elements) can have different locations within the image, and may have different aspect rations. Selecting a large number of regions to analyze using conventional CNN techniques may result in computational inefficiencies. Thus, in the region-based CNN (R-CNN) approach, a finite number of proposed regions are selected and analyzed.

An FPN is a feature extractor that generates multiple feature map layers (multi-scale feature maps) for object detection. Each feature map layer corresponds to a different resolution. That is, each layer of the feature pyramid represents the image feature using an array with a different number of values.

In some cases, the ANN may also include an attention mechanism. An attention mechanism is a method of placing differing levels of importance on different elements of an input. Calculating attention may involve three basic steps. First, compute the similarity between query and key vectors obtained from the input to generate attention weights. Similarity functions may include dot product, splice, detector, etc. Next, use a softmax function to normalize the weights. Finally, weigh the attention weights in together with the corresponding values.

Training component 330 identifies training data including a set of input images and panoptic segmentation information for each of the set of input images. After the panoptic segmentation component 325 provides predicted panoptic segmentation information, training component 330 compares the predicted panoptic segmentation information to the ground truth panoptic segmentation information for each of the set of input images. Training component 330 may then update the ANN based on the comparison.

System Architecture

Figure 4:
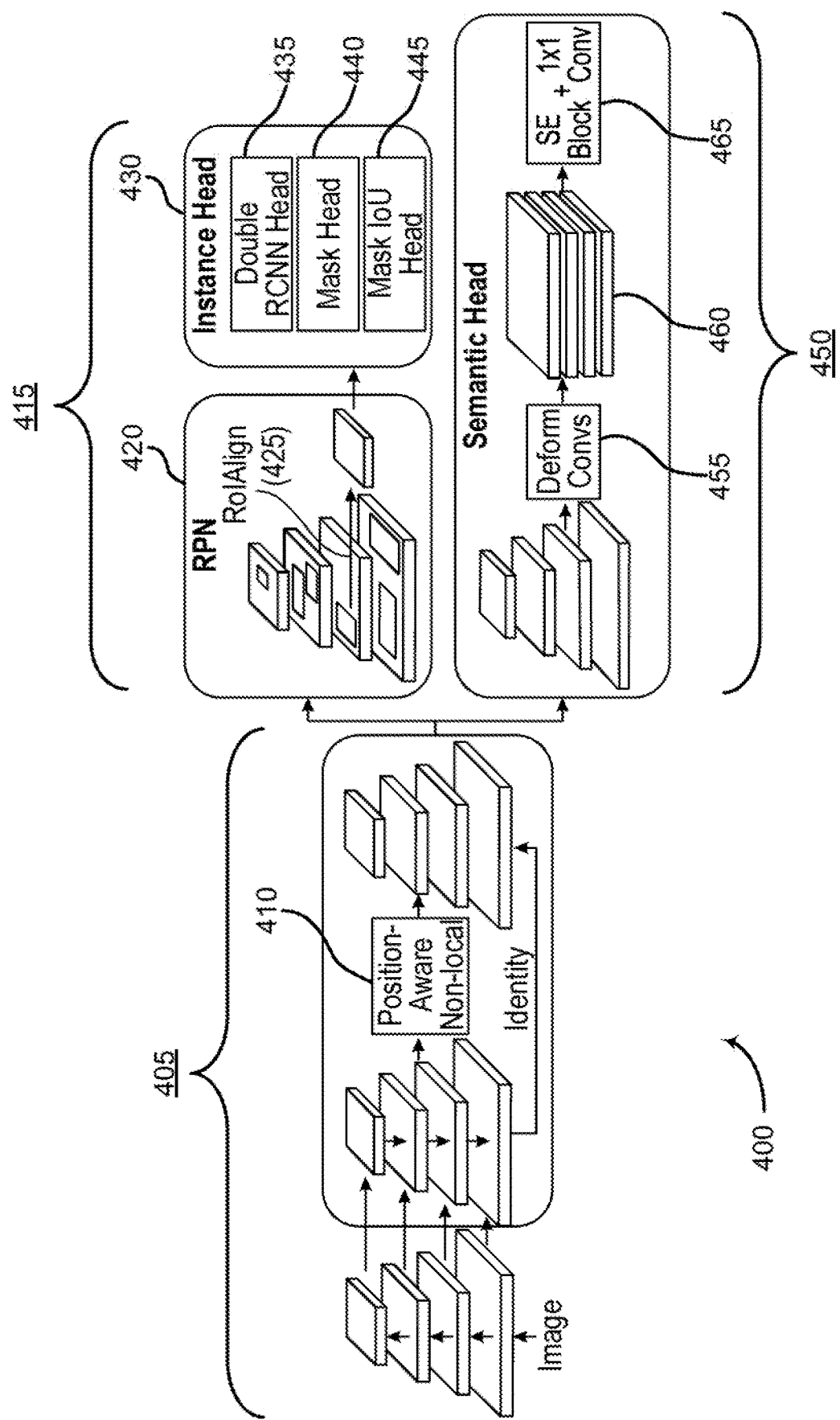
FIG. 4 shows an example of a network architecture for panoptic segmentation according to aspects of the present disclosure.

FIG. 4 shows an example of a network architecture for panoptic segmentation according to aspects of the present disclosure. Computing device 400 may include feature pyramid component 405, instance component 415, and semantic component 450.

Feature Extraction "Neck"

According to an embodiment, in a panoptic segmentation network, two segmentation heads share a pyramidal "neck" representation. Feature pyramid component 405 generates a feature pyramid for an input image. The feature pyramid includes a set of feature maps at different resolution levels. In some cases, feature pyramid component 405 may identify a relative position representation of the combined feature map, where the attention module 410 is applied based on the relative position representation.

Feature pyramid component 405 may include attention module 410. In some cases, feature pyramid component 405 applies the attention module 410 to the feature pyramid output of the feature pyramid component 405 to produce an enhanced feature map. Feature pyramid component 405 then combines the enhanced feature map with each of the set of feature maps to produce an enhanced feature pyramid, and resizes each of the set of feature maps to a common resolution. Feature pyramid component 405 may then average each of the resized feature maps to produce a combined feature map, where the attention module 410 is applied to the combined feature map.

Some examples of the feature pyramid component 405 may utilize top-down feature integration, while in other examples, bottom up feature integration may be used. Integrating features sequentially may dilute important semantic information contained in non-adjacent layers. Therefore, in some cases, the feature pyramid may be strengthened using the same balanced semantic features. When these enhanced features are used along with a standard FPN, a much richer feature pyramid can be obtained.

Feature pyramid component 405 may employ a feature pyramid network to generate pyramidal feature representations. In some embodiments, these features may be enhanced using an attention network since both the instance head and semantic head share and utilize them.

In one example, a feature pyramid may be enhanced using the same deeply integrated, balanced semantic features. Some embodiments may include four steps: rescaling, integrating, refining, and strengthening. At the first rescaling step, the multi-level features $\{C_l | l \in [l_{min}, \ldots, l_{max}]\}$ are resized to an intermediate target size (e.g., $C_4$) using nearest-neighbor interpolation and max-pooling. Once the features are rescaled, the integrating step follows. The balanced semantic features may be obtained by simple averaging as $$C = \frac{1}{L} \sum_{lmin}^{lmax} C_l,$$

where L denotes the number of multilevel features.

The obtained features, C, may be refined through embedded gaussian non-local attention. The resulting features may be rescaled using the reverse procedures of the rescaling step and then added to the original features in a residual fashion (i.e., strengthening). Note that except for the refining step, the procedure may not contain any parameters.

In some examples, an attention layer transforms a sequence of N D-dimensional vectors $X=(x_1, \ldots, x_n)$ into queries $Q=XW^Q$, keys $K=XW^K$, and values $V=XW^V$, where $W^Q$, $W^K$, and $W^V$ are D×D matrices. Since the attention layer employs H attention heads, each query, key and value matrix $$\left( \in \mathbb{R}^{N \times D_h}, D_h = \frac{D}{H} \right).$$

The scaled dot-product attention for each head may be computed using a softmax function $Z_h$.

$$Z_h = \text{Softmax}\left(\frac{Q_h K_h^T}{\sqrt{D_h}}\right) V_h \quad (1)$$

Finally, the attention outputs for each head may be concatenated and linearly transformed to obtain Z. In some cases, the embedded Gaussian non-local attention is a special case of scaled dot-product attention with H=1.

According to certain embodiments, the parametric refining step (i.e., nonlocal attention) may be further modified. Starting from the original embedded gaussian form, two variants may be introduced. First, apply a multi head operation which provides an in-module ensemble effect (e.g., with H=8). Second, employ a relative position representation that allows attention to be informed by how far apart two positions are in an image. This may involve learning a relative position embedding of each possible pairwise distance between a query and key.

In one example embodiment, pixels in the 2D image may be used as primitive elements instead of words in sequence to provide a position embedding. Thus, the target task may be decomposed into two sub-tasks relating to 1D relative position embeddings over the x-axis and y-axis, respectively. The relative position of each axis may be projected to a high-dimensional representation using different wavelengths of sine and cosine functions. The embeddings may be learned separately for each head and interact with queries through the matrix multiplication. For each head, the resulting embedding matrix $R_h^{rel} \in \mathbb{R}^{N \times N}$ modulates the attention weights.

$$\text{Softmax}\left(\frac{Q_h K_h^T + R_h^{rel}}{\sqrt{D_h}}\right) V_h \quad (2)$$

This formulation may be applied to the refining step described above. In some cases, this enhanced FPN neck may substantially outperform conventional feature extraction methods in PQ.

In some embodiments of the feature neck, detectors may use a ResNet50+FPN backbone. However, regardless of the detector type, embodiments of the present disclosure provide improvements over conventional panoptic segmentation networks according to AR, AP, and PQ metrics.

The effectiveness of various design choices (i.e., multi-head and 2D relative position encoding) may be shown using ablation studies conducted on the COCO evaluation set. For example, a bidirectional feature pyramid network (BFPN) (H=1 and without $R^{rel}$) may be used as a baseline.

The performance of the baseline may then be compared using different numbers of heads and the additional 2D relative position encoding.

According to one example, increasing the head count may improve performance up to a saturation level of H=8. This can be seen as an ensemble effect. Meanwhile, adding the 2D relative position information consistently results in improved evaluation metrics. This implies that modeling and utilizing the relative position is useful for recognition, and it can be complementary to the ensemble effect.

According to an exemplary embodiment, both features may be used together (H=8 with $R^{rel}$). The results of this technique can also be compared to an embodiment that includes stacking a nonlocal module multiple times (i.e., multiple refinements). For example, three non-local modules may be stacked. However, in certain cases, this stacking does not provide superior results. This indicates that simply using more non-local modules may not effectively model either the current in-module ensemble effect or relative position information, and may be subject to overfitting.

Region Proposal

Instance component 415 may include region proposal component 420 and instance head 430. Region proposal component 420 generates a set of object regions based on the enhanced feature pyramid. In some embodiments, region proposal component 420 may include alignment component 425.

In one embodiment, region proposal component 420 identifies a set of anchor points based on the enhanced feature pyramid. Region proposal component 420 may then perform an adaptive convolution on each of the set of anchor points to produce a set of refined anchor points. In some cases, region proposal component 420 may also generate a learned offset for each of the set of refined anchor points, where the learned offset is configured to align the refined anchor points and features of the input image. Region proposal component 420 may also apply a modulation mechanism to the refined anchor points and the corresponding learned offsets, where the set of object regions are based on the modulation mechanism.

In some embodiments, region proposal component 420 applies a fully connected layer to each of the set of object regions. Region proposal component 420 may also apply a convolution layer to an output of the fully connected layer, where the instance information is based on an output of the convolution layer.

A region proposal component 420 is used for object detection. In some examples, region proposal component 420 first yields sparse region proposals from a dense set of anchors, classifies them into specific classes, and refines their locations via bounding box regression. A two-step attention process enables the production of accurate bounding boxes while maintaining computation tractability.

Some embodiments incorporate a two-stage object detector including a Mask R-CNN, and an RPN. In some cases, arbitrarily shaped anchors identified in multiple steps can provide a high level of model flexibility, and may improve performance when dealing with complex objects and scenes. Accordingly, embodiments of the present disclosure include a multi-stage anchoring scheme. For example, a feature alignment method may be combined with a Cascade RPN.

In some cases, a panoptic FPN uses a uniform anchoring scheme where every location in a feature map is associated with k anchors with predefined scales and aspect ratios. However, a uniform anchoring scheme may be sensitive to hyperparameters (i.e., scales, aspect ratios) and may also depend on a large number of anchors to ensure high-recall.

Alternative anchoring schemes (i.e., multi-stage anchoring) may learn to predict the sparse set of non-uniform and arbitrary shaped anchors in a multiple-step (i.e., 2 or 3). This method can be more effective and robust in dealing with complex objects and scenes.

In one embodiment, a single anchor may be used (i.e., instead of using multiple anchors with different scales and aspect ratios). A multi-stage refinement may be performed that takes the output of a previous stage as the input of the current stage and repeats until accurate localization is obtained. To maintain the alignment between anchor boxes and features, adaptive convolution may be used to adapt the refined anchors after each stage. For each location p on the output feature y, the adaptive convolution can be mathematically expressed as in equation 3.

$$y[p] = \sum_{o \in O} w[o] \cdot x[p + o] \quad (3)$$

The convolution grid G is replaced by the new offset field O that is directly inferred from the input anchor. The offset o can be decoupled into a center offset and a shape offset as $o = o_{ctr} + o_{shp}$, where $o_{ctr} = (\bar{a}_x - p_x, \bar{a}_y - p_y)$ and $o_{shp}$ is defined by the anchor shaped and kernel size. In some examples, adaptation of a refined anchor may also be used.

According to certain embodiments, offsets may be learned for the refined anchor points.

$$y[p] = \sum_{o \in O} w[o] \cdot x[p + o + \Delta o] \quad (4)$$

Thus, the adaptive convolution may perform sampling within the anchors to improve a deformable convolution-based alignment.

However, in some cases adaptive convolution is still sub-optimal. For example, if the sampling points are deterministically derived from the anchors, there is uncertainty regarding whether those include the richest representation set. Therefore, the adaptive convolution may be generalized by dynamically learning the offsets given the refined anchor points as initial sampling points. This formulation degenerates to the Cascade RPN formulation if $\Delta o = 0$.

Other modifications may also be used. For example, First, group convolution may be used when conducting the sampling. This enables the model to learn different offset patterns for each group and thus can extract features densely. Second, a modulation mechanism may be used.

$$y[p] = \sum_{o \in O} w[o] \cdot x[p + o + \Delta o] \cdot \Delta m \quad (5)$$

Both $\Delta o$ and $\Delta m$ may be obtained using a single convolution layer of the input feature map x. Specifically, the output of a convolution layer may include $3|O|$ channels, where the first $2|O|$ channels are used for the learned offsets, and the remaining $|O|$ channels are further fed to a sigmoid layer to obtain the modulation scalars. Thus offsets of the initial refined anchor points may be adjusted, and the sample features may be modulated. In some examples, these modification result in improved recall-rate, improved PQ metrics, or both.

For example, embodiments of the present disclosure provide improved results in terms of Average Recall (AR) under various threshold settings of proposal thresholds. This indicates that in some cases, a dynamic offset can outperform deterministic adaptation.

To investigate the benefit of various components of the region proposal component, embodiments of the present disclosure may be integrated into various object detectors. Despite high-quality region proposals, training a good detector is still a non-trivial problem. For example, in one embodiment, an IoU threshold of 0.65 may be used along with 300 proposals for training. Experiments verify that embodiments of the present disclosure consistently outperform conventional methods when integrated into the various detectors.

Ablation studies may be used to determine the efficacy of various design choices (i.e., offset learning, group convolution, modulation). A Cascade RPN may be used as a baseline. Experiments show that scores increase when offset learning is applied, showing that better feature alignment for the refined anchors can be achieved by learning the offsets. The incorporation of group convolution further improves the results. According to one embodiment, peak results can be achieved when the group number is set to 4. Finally, applying a modulation mechanism also yields additional improvement.

Instance Head

Instance component 415 generates instance information for each of the set of object regions. In some cases, instance component 415 may also identify classification confidence information for each of the object regions. Instance component 415 may then identify intersection over union (IoU) information for each of the object regions. Instance component 415 may combine the classification confidence information and the IoU information to produce mask information for each of the object regions, where the instance information is based on the mask information.

In some embodiments, instance head 430 may include double RCNN head 435, mask head 440, and mask IoU head 445.

According to some embodiments, instance head 430 includes two distinct streams: one corresponding to the double RCNN head 435 and another corresponding to the mask head 440. For example, a double head approach may be used to producing accurate bounding boxes, and a mask-scoring head may correct the mask confidences. The combination of these methods may result in a strong instance segmentation and improve the panoptic segmentation performance.

Some examples of a panoptic segmentation include a double RCNN head 435. Some two-stage object detectors share a single type detection head (i.e., fully connected or convolutional) for both classification and bounding box regression tasks. However, in some embodiments a fully connected head may be used for classification and a convolution head may be used for bounding box regression. The fully connected head may be used to capture the whole spatial context, which may improve for the classification. On the other hand, the convolution head may exploit object-level context that is more suitable for predicting the bounding box offsets.

Certain embodiments also include a mask head 440. Although some instance segmentation networks use classification confidence as mask score, in certain cases, classification confidence does not reflect the mask quality and only serves to distinguish the semantic categories. Therefore, an additional head may be used to predict a Mask IoU. By multiplying the predicted Mask IoU and classification confidence in the testing phase, a calibrated score can be obtained that includes both semantic categories and the instance mask completeness information. Thus, a mask head using this technique may be used to prioritize well-aligned masks at inference.

Semantic Head

Semantic component 450 generates semantic information for the input image based on a feature pyramid. In some cases, semantic component 450 applies a set of deformable convolutions to each level of the enhanced feature pyramid using a same convolution head. Semantic component 450 may also upscale an output of the convolution head. Semantic component 450 may concatenate the upscaled output of the convolution head. Semantic component 450 may then apply an squeeze-and-excitation (SE) layer to the concatenated upscaled output of the convolution head, where the semantic information is based on an output of the SE layer.

Semantic component 450 may include deformable convolution layers 455, SE block 460, and prediction layer 465. Thus, according to some embodiments, a semantic head predicts an accurate semantic segmentation map using two strategic elements: a large receptive field and multi-scale feature fusion. A panoptic segmentation network may achieve both using a semantic head including an asymmetric decoder (e.g., FPN), upsampling convolutions, and a feature summation operation. However, some instance head architectures fail to capture contextual information, and include noise from feature fusing. Thus, certain embodiments of the present disclosure include deformable convolutions and an SE block.

In some panoptic segmentation networks, every level of a set of FPN features is associated with a different number of convolution blocks, where each block consists of 3×3 convolution, group norm, ReLU, and 2× bilinear upsampling. The result is a set of feature maps at the same ¼ scale, which are then element-wise summed. To get a final prediction map at the original image resolution, a final 1×1 convolution, 4× bilinear upsampling, and softmax may be used.

In certain embodiments, semantic information may be obtained using deformable convolution and an attention mechanism. For example, a semantic head may include three deformable convolutions, which enlarge the receptive fields of the model effectively. For efficiency, a head may be shared across the feature pyramid and the processed features may be concatenated after upsampling to ¼ scale. An SE block may be applied to the concatenated features before the final prediction layer.

Ablation studies can be used to determine whether each component of the semantic head contributes to the final panoptic quality. A Panoptic FPN may be used as a baseline for comparison. Using a deformable convolution-based head results in improvements in PQ. Applying the SE block further improves performance. Experiments show that using attentional feature fusion, and securing a large receptive field in the semantic head can also improve performance.

Inference

Figure 5:
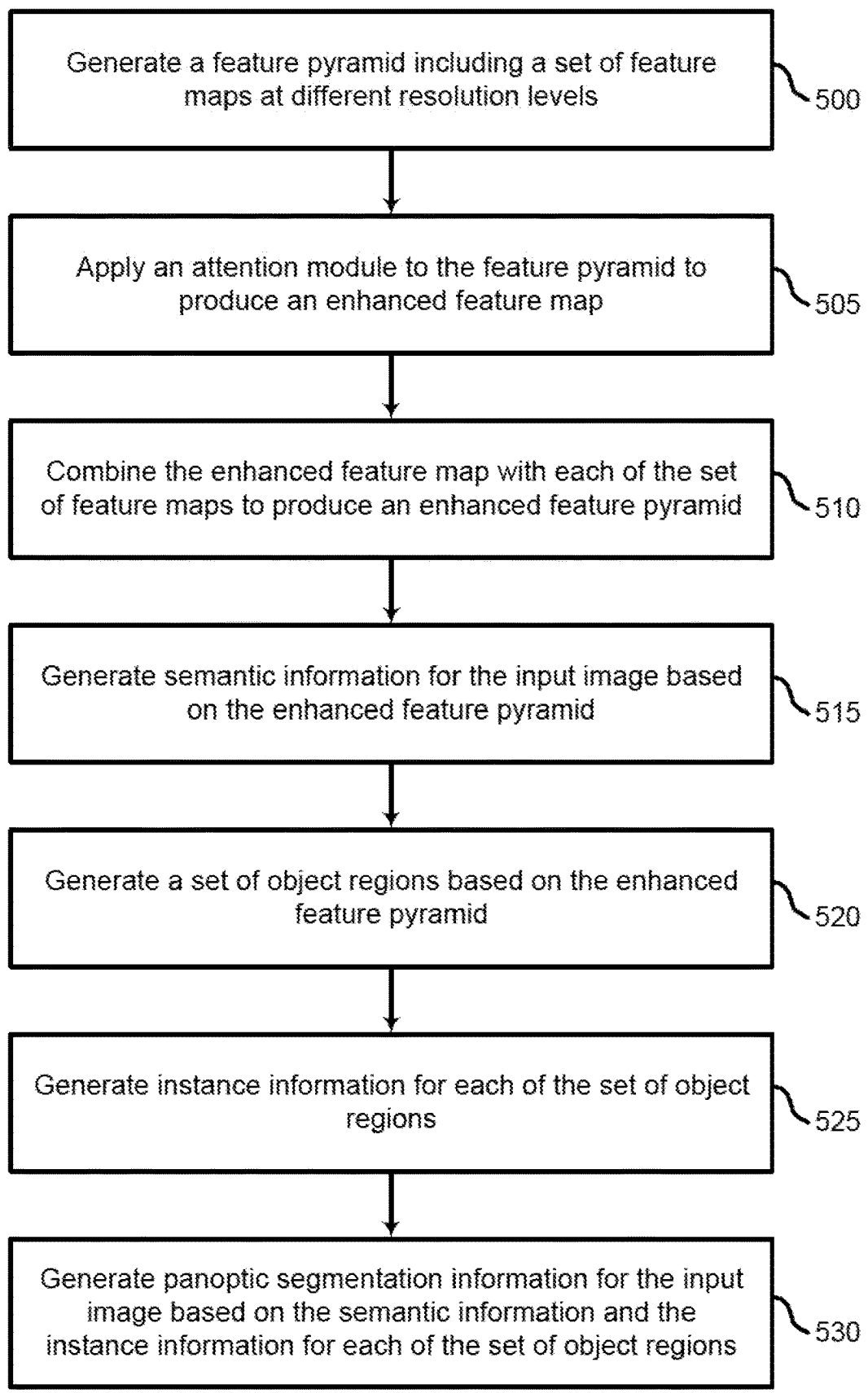
FIG. 5 shows an example of a process for panoptic segmentation according to aspects of the present disclosure.

FIG. 5 shows an example of a process for panoptic segmentation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 500, the system generates a feature pyramid for an input image, where the feature pyramid includes a set of feature maps at different resolution levels. In some cases, the operations of this step may refer to, or be performed by, a feature pyramid component as described with reference to FIG. 4. At operation 505, the system applies an attention module to the feature pyramid to produce an enhanced feature map. In some cases, the operations of this step may refer to, or be performed by, a feature pyramid component as described with reference to FIG. 4. At operation 510, the system combines the enhanced feature map with each of the set of feature maps to produce an enhanced feature pyramid. In some cases, the operations of this step may refer to, or be performed by, a feature pyramid component as described with reference to FIG. 4.

According to some embodiments, generating an enhanced feature pyramid may include four steps: rescaling, integrating, refining, and strengthening. At the first rescaling step, the multi-level features are resized to an intermediate target size using nearest-neighbor interpolation and max-pooling. Once the features are rescaled, the integrating step follows. The balanced semantic features may be obtained by simple averaging. The obtained features may be refined through embedded gaussian non-local attention. The resulting features may be rescaled using the reverse procedures of the rescaling step and then added to the original features in a residual fashion (i.e., strengthening). Further detail regarding an exemplary process for generating a feature pyramid is described below with reference to FIG. 6.

At operation 515, the system generates semantic information for the input image based on the enhanced feature pyramid. In some cases, the operations of this step may refer to, or be performed by, a semantic component as described with reference to FIG. 4.

According to some embodiments, a semantic head predicts an accurate semantic segmentation map using two strategic elements: a large receptive field and multi-scale feature fusion. A panoptic segmentation network may achieve both using a semantic head including an asymmetric decoder (e.g., FPN), upsampling convolutions, and a feature summation operation. However, some instance head architectures fail to capture contextual information, and include noise from feature fusing. Accordingly, certain embodiments of the present disclosure include deformable convolutions and an SE block. Further detail regarding an exemplary process for generating semantic information is described below with reference to FIG. 9.

At operation 520, the system generates a set of object regions based on the enhanced feature pyramid. In some cases, the operations of this step may refer to, or be performed by, a region proposal component as described with reference to FIG. 4. Further detail regarding an exemplary process for generating object regions is described below with reference to FIG. 7.

At operation 525, the system generates instance information for each of the set of object regions. In some cases, the operations of this step may refer to, or be performed by, an instance component as described with reference to FIG. 4.

For example, some embodiments incorporate a two-stage object detector including a Mask R-CNN, and an RPN. In some cases, arbitrarily shaped anchors identified in multiple steps can provide a high level of model flexibility, and may improve performance when dealing with complex objects and scenes. Accordingly, embodiments of the present disclosure include a multi-stage anchoring scheme. For example, a feature alignment method may be combined with a Cascade RPN. Further detail regarding an exemplary process for generating instance information is described below with reference to FIG. 8.

At operation 530, the system generates panoptic segmentation information for the input image based on the semantic information and the instance information for each of the set of object regions. For example, the panoptic segmentation information may include classification information for each pixel of an image, where the classification information identifies both foreground object instances and background categories. In some cases, the operations of this step may refer to, or be performed by, a panoptic segmentation component as described with reference to FIG. 3.

According to one embodiment, a panoptic segmentation network may be implemented using PyTorch and mmdetection. For COCO, an exemplary model may be trained with 8 GPUs with a batch size of 16 (two images per GPU) for 12 epochs using the stochastic gradient descent (SGD) optimizer. The learning rate may be initialized to 0.02, and may be divided by 10 after 8 and 11 epochs. For Cityscapes, the same batch size configuration may be used as for COCO, and the network may be trained for 18 epochs using a stochastic gradient descent (SGD) optimizer. The learning rate may again be initialized to 0.02, but may be divided by 10 after 12 and 16 epochs.

According to various embodiments, a ResNet50 and ResNet101 may be used as a backbone. Experiments show that embodiments of the present disclosure improve performance using either backbone. Additional improvements can be achieved using an improved panoptic segmentation head, attention modules, an objective function and occlusion learning. With the ResNet50 backbone, a baseline model and an exemplary embodiment consist of 46.1 M and 68.6 M parameters, respectively. The increased parameters mainly come from Double instance head (+5.6 MB) and Mask-scoring head (+16.3 MB).

To show that the significant performance improvement is not merely due to the increased capacity, the exemplary embodiment may be compared to a conventional baseline model that adopts a deep backbone. In particular, we evaluate the baseline model with ResNet101, which uses 65.1 MB. In the experiment, the exemplary model achieves an improved PQ score. Therefore, it can be demonstrated that embodiments of the present invention improve performance due to modified architecture and not merely due to an increased number of parameters.

Figure 6:
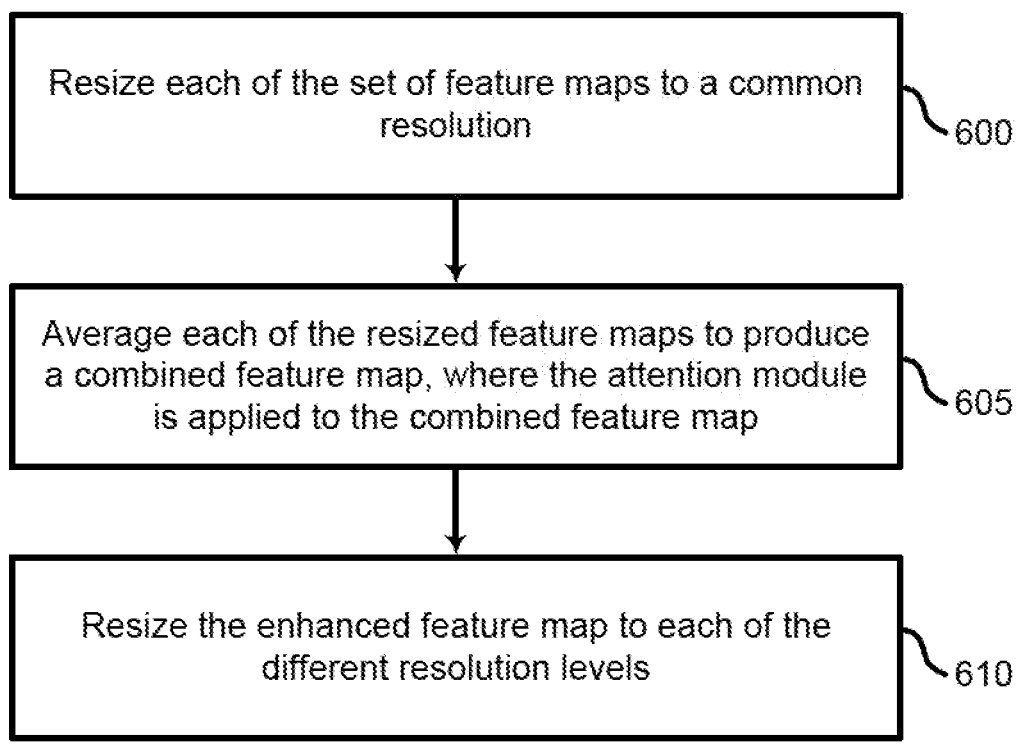
FIG. 6 shows an example of a process for generating an enhanced feature pyramid according to aspects of the present disclosure.

FIG. 6 shows an example of a process for generating an enhanced feature pyramid according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 600, the system resizes each of the set of feature maps to a common resolution. In some cases, the operations of this step may refer to, or be performed by, a feature pyramid component as described with reference to FIG. 4.

At operation 605, the system averages each of the resized feature maps to produce a combined feature map, where the attention module is applied to the combined feature map. In some cases, the operations of this step may refer to, or be performed by, a feature pyramid component as described with reference to FIG. 4.

At operation 610, the system resizes the enhanced feature map to each of the different resolution levels. In some cases, the operations of this step may refer to, or be performed by, a feature pyramid component as described with reference to FIG. 4.

Figure 7:
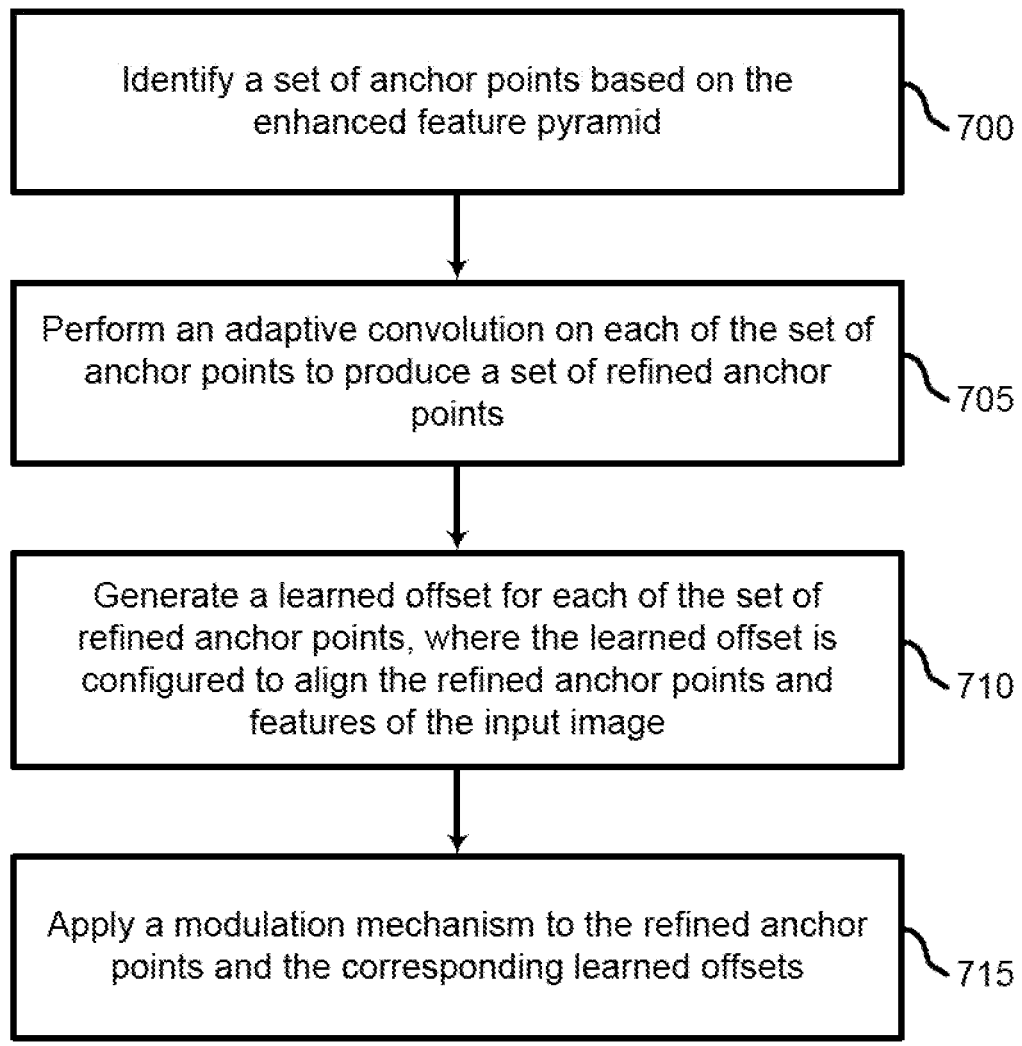
FIG. 7 shows an example of a process for generating region proposals according to aspects of the present disclosure.

FIG. 7 shows an example of a process for generating region proposals according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 700, the system identifies a set of anchor points based on the enhanced feature pyramid. In some cases, the operations of this step may refer to, or be performed by, a region proposal component as described with reference to FIG. 4.

At operation 705, the system performs an adaptive convolution on each of the set of anchor points to produce a set of refined anchor points. In some cases, the operations of this step may refer to, or be performed by, a region proposal component as described with reference to FIG. 4.

At operation 710, the system generates a learned offset for each of the set of refined anchor points, where the learned offset is configured to align the refined anchor points and features of the input image. In some cases, the operations of this step may refer to, or be performed by, a region proposal component as described with reference to FIG. 4.

At operation 715, the system applies a modulation mechanism to the refined anchor points and the corresponding learned offsets. In some cases, the operations of this step may refer to, or be performed by, a region proposal component as described with reference to FIG. 4.

Figure 8:
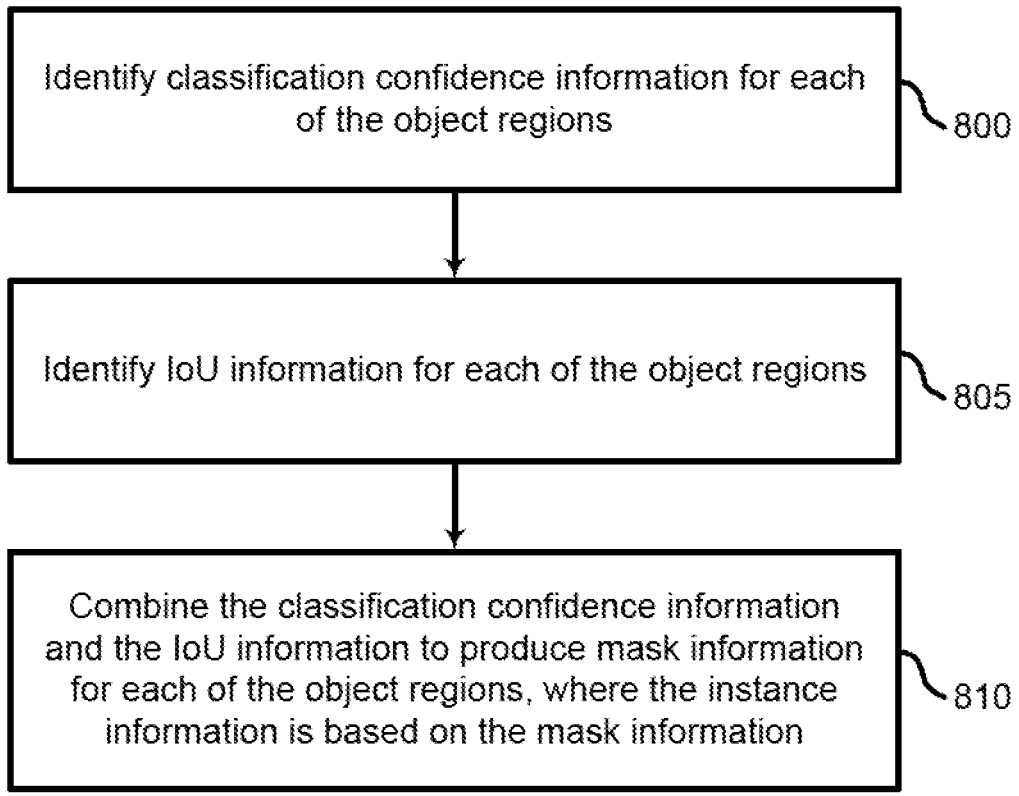
FIG. 8 shows an example of a process for generating instance information according to aspects of the present disclosure.

FIG. 8 shows an example of a process for generating instance information according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 800, the system identifies classification confidence information for each of the object regions. In some cases, the operations of this step may refer to, or be performed by, an instance component as described with reference to FIG. 4.

At operation 805, the system identifies IoU information for each of the object regions. In some cases, the operations of this step may refer to, or be performed by, an instance component as described with reference to FIG. 4.

At operation 810, the system combines the classification confidence information and the IoU information to produce mask information for each of the object regions, where the instance information is based on the mask information. In some cases, the operations of this step may refer to, or be performed by, an instance component as described with reference to FIG. 4.

Figure 9:
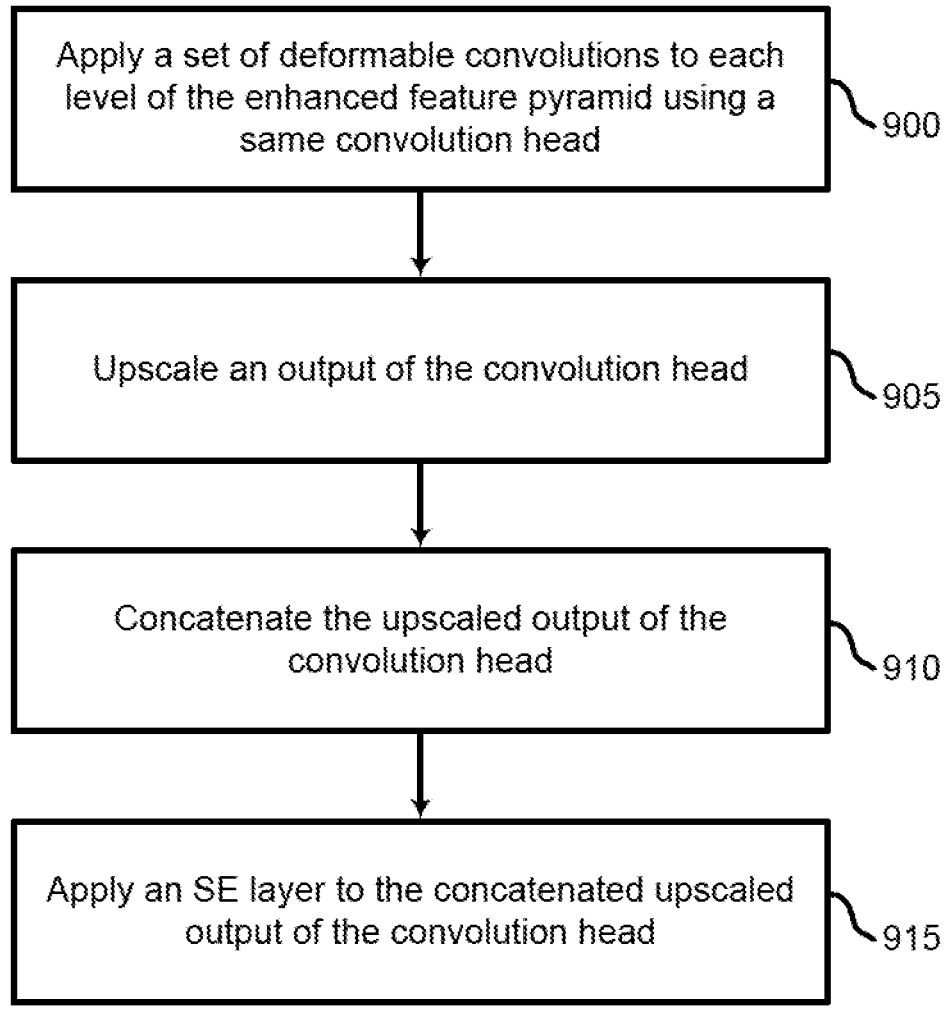
FIG. 9 shows an example of a process for generating semantic information according to aspects of the present disclosure.

FIG. 9 shows an example of a process for generating semantic information according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 900, the system applies a set of deformable convolutions to each level of the enhanced feature pyramid using a same convolution head. In some cases, the operations of this step may refer to, or be performed by, a semantic component as described with reference to FIG. 4.

At operation 905, the system upscales an output of the convolution head. In some cases, the operations of this step may refer to, or be performed by, a semantic component as described with reference to FIG. 4.

At operation 910, the system concatenates the upscaled output of the convolution head. In some cases, the operations of this step may refer to, or be performed by, a semantic component as described with reference to FIG. 4.

At operation 915, the system applies an SE layer to the concatenated upscaled output of the convolution head. In some cases, the operations of this step may refer to, or be performed by, a semantic component as described with reference to FIG. 4.

Training and Evaluation

Figure 10:
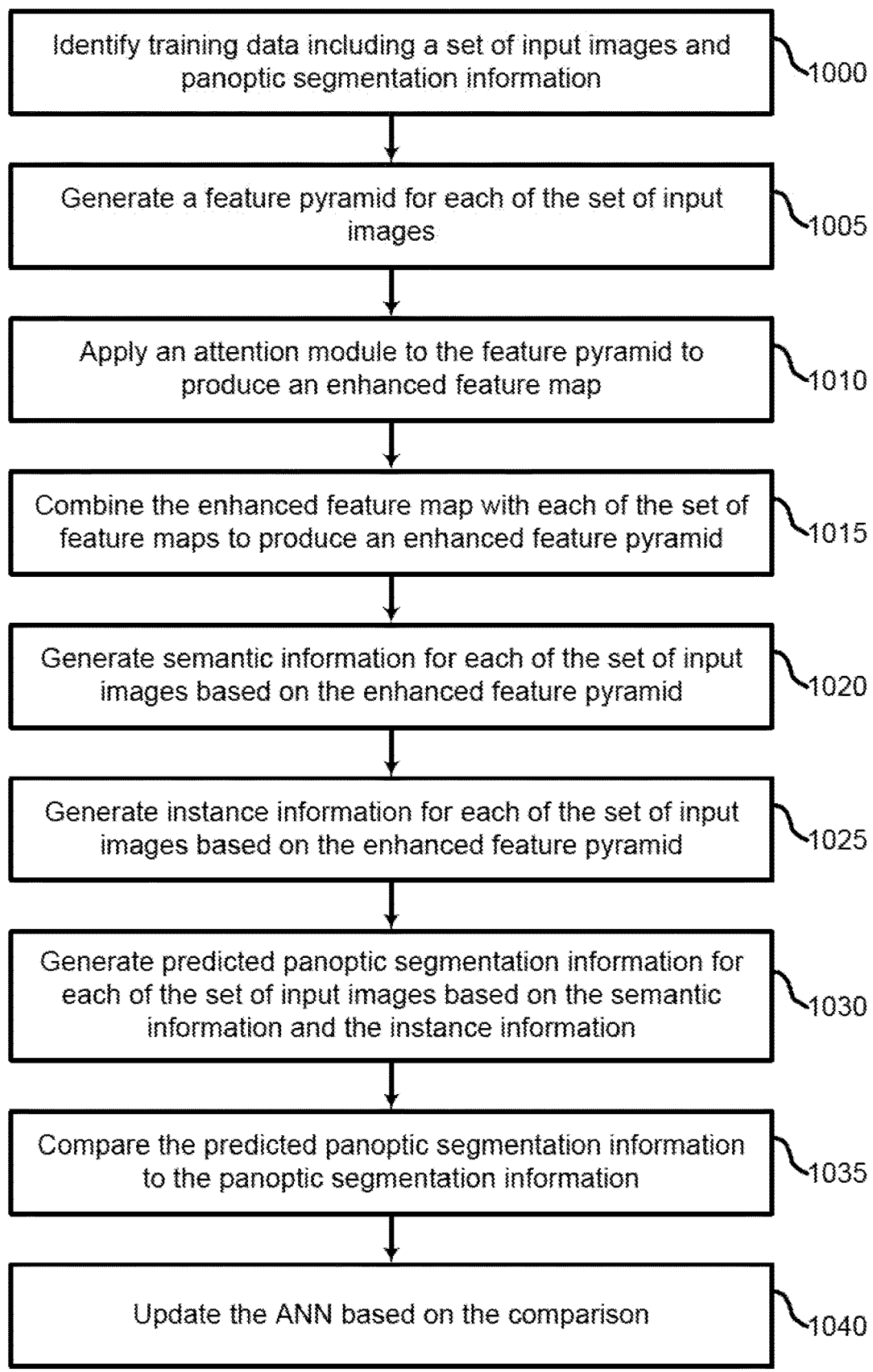
FIG. 10 shows an example of a process for training an artificial neural network (ANN) according to aspects of the present disclosure.

FIG. 10 shows an example of a process for training an ANN according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 1000, the system identifies training data including a set of input images and panoptic segmentation information for each of the set of input images. In some cases, the operations of this step may refer to, or be performed by, a training component as described with reference to FIG. 3.

At operation 1005, the system generates a feature pyramid for each of the set of input images, where the feature pyramid includes a set of feature maps at different resolution levels. In some cases, the operations of this step may refer to, or be performed by, a feature pyramid component as described with reference to FIG. 4.

At operation 1010, the system applies an attention module to the feature pyramid to produce an enhanced feature map. In some cases, the operations of this step may refer to, or be performed by, a feature pyramid component as described with reference to FIG. 4.

At operation 1015, the system combines the enhanced feature map with each of the set of feature maps to produce an enhanced feature pyramid. In some cases, the operations of this step may refer to, or be performed by, a feature pyramid component as described with reference to FIG. 4.

At operation 1020, the system generates semantic information for each of the set of input images based on the enhanced feature pyramid. In some cases, the operations of this step may refer to, or be performed by, a semantic component as described with reference to FIG. 4.

At operation 1025, the system generates instance information for each of the set of input images based on the enhanced feature pyramid. In some cases, the operations of this step may refer to, or be performed by, an instance component as described with reference to FIG. 4.

At operation 1030, the system generates predicted panoptic segmentation information for each of the set of input images based on the semantic information and the instance information for each of the set of object regions. In some cases, the operations of this step may refer to, or be performed by, a panoptic segmentation component as described with reference to FIG. 3.

At operation 1035, the system compares the predicted panoptic segmentation information to the panoptic segmentation information for each of the set of input images. In some cases, the operations of this step may refer to, or be performed by, a training component as described with reference to FIG. 3.

At operation 1040, the system updates the ANN based on the comparison. In some cases, the operations of this step may refer to, or be performed by, a training component as described with reference to FIG. 3.

According to one embodiment, a panoptic segmentation network can be trained in an end-to-end manner using a multi-task loss. For example, a loss function may contain loss functions in total, including losses related to the RPN (two-stage box classification and regression), instance head (box classification and regression, mask segmentation, Mask IoU prediction), and semantic head (pixel-wise classification). For loss weighting, a loss balance strategy may be applied. During the panoptic inference, post-processing may be used to resolve overlaps.

Various individual components may be analyzed using the COCO dataset. It consists of 115 k images for training and 5 k images for validation. There are also 20 k images that have no disclosed labels. Evaluation metrics may include Average Recall (AR) and Average Precision (AP) metrics.

To evaluate the complete panoptic segmentation model, the COCO and Cityscapes datasets may be used. For the COCO evaluation, the setup of the COCO panoptic segmentation task may be used. This setup consists of 80 and 53 classes (for things and stuff, respectively).

The Cityscape dataset has 5000 images of egocentric driving scenarios in urban settings which are split into 2975, 500 and 1525 for training, validation, and testing, respectively. There are 19 classes, 8 classes for things and 11 classes for stuff A PQ metric may be used that captures both recognition and segmentation quality, and treats both stuff and thing categories in a unified manner.

Accordingly, the present disclosure includes the following embodiments.

A method for panoptic segmentation is described. Embodiments of the method may include generating a feature pyramid for an input image, wherein the feature pyramid comprises a plurality of feature maps at different resolution levels, apply an attention module to the feature pyramid to produce an enhanced feature map, combining the enhanced feature map with each of the plurality of feature maps to produce an enhanced feature pyramid, generating semantic information for the input image based on the enhanced feature pyramid, generating a plurality of object regions based on the enhanced feature pyramid, generating instance information for each of the plurality of object regions, and generating panoptic segmentation information for the input image based on the semantic information and the instance information for each of the plurality of object regions.

An apparatus for panoptic segmentation is described. The apparatus may include a processor, memory in electronic communication with the processor, and instructions stored in the memory. The instructions may be operable to cause the processor to generate a feature pyramid for an input image, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for the input image based on the enhanced feature pyramid, generate a plurality of object regions based on the enhanced feature pyramid, generate instance information for each of the plurality of object regions, and generate panoptic segmentation information for the input image based on the semantic information and the instance information for each of the plurality of object regions.

A non-transitory computer readable medium storing code for panoptic segmentation is described. In some examples, the code comprises instructions executable by a processor to: generate a feature pyramid for an input image, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for the input image based on the enhanced feature pyramid, generate a plurality of object regions based on the enhanced feature pyramid, generate instance information for each of the plurality of object regions, and generate panoptic segmentation information for the input image based on the semantic information and the instance information for each of the plurality of object regions.

Some examples of the method, apparatus, non-transitory computer readable medium, and system described above may further include resizing each of the plurality of feature maps to a common resolution. Some examples may further include averaging each of the resized feature maps to produce a combined feature map, wherein the attention module is applied to the combined feature map. Some examples may further include resizing the enhanced feature map to each of the different resolution levels, wherein each of the plurality of feature maps is combined with the resized enhanced feature map at the corresponding different resolution level.

Some examples of the method, apparatus, non-transitory computer readable medium, and system described above may further include identifying a relative position representation of the combined feature map, wherein the attention module is applied based on the relative position representation.

Some examples of the method, apparatus, non-transitory computer readable medium, and system described above may further include identifying a plurality of anchor points based on the enhanced feature pyramid. Some examples may further include performing an adaptive convolution on each of the plurality of anchor points to produce a plurality of refined anchor points. Some examples may further include generating a learned offset for each of the plurality of refined anchor points, wherein the learned offset is configured to align the refined anchor points and features of the input image. Some examples may further include applying a modulation mechanism to the refined anchor points and the corresponding learned offsets, wherein the plurality of object regions are based on the modulation mechanism.

Some examples of the method, apparatus, non-transitory computer readable medium, and system described above may further include applying a fully connected layer to each of the plurality of object regions. Some examples may further include applying a convolution layer to an output of the fully connected layer, wherein the instance information is based at least in part on an output of the convolution layer.

Some examples of the method, apparatus, non-transitory computer readable medium, and system described above may further include identifying classification confidence information for each of the object regions. Some examples may further include identifying intersection over union (IoU) information for each of the object regions. Some examples may further include combining the classification confidence information and the IoU information to produce mask information for each of the object regions, wherein the instance information is based at least in part on the mask information.

Some examples of the method, apparatus, non-transitory computer readable medium, and system described above may further include applying a plurality of deformable convolutions to each level of the enhanced feature pyramid using a same convolution head. Some examples may further include upscaling an output of the convolution head. Some examples may further include concatenating the upscaled output of the convolution head. Some examples may further include apply a squeeze-and-excitation (SE) layer to the concatenated upscaled output of the convolution head, wherein the semantic information is based on an output of the SE layer.

A method of training an ANN for panoptic segmentation is described. Embodiments of the method may include identifying training data comprising a plurality of input images and panoptic segmentation information for each of the plurality of input images, generating a feature pyramid for each of the plurality of input images, wherein the feature pyramid comprises a plurality of feature maps at different resolution levels, applying an attention module to the feature pyramid to produce an enhanced feature map, combining the enhanced feature map with each of the plurality of feature maps to produce an enhanced feature pyramid, generating semantic information for each of the plurality of input images based on the enhanced feature pyramid, generating instance information for each of the plurality of input images based on the enhanced feature pyramid, generating predicted panoptic segmentation information for each of the plurality of input images based on the semantic information and the instance information for each of the plurality of object regions, comparing the predicted panoptic segmentation information to the panoptic segmentation information for each of the plurality of input images, and updating the artificial neural network (ANN) based on the comparison.

An apparatus for training an ANN for panoptic segmentation is described. The apparatus may include a processor, memory in electronic communication with the processor, and instructions stored in the memory. The instructions may be operable to cause the processor to identify training data comprising a plurality of input images and panoptic segmentation information for each of the plurality of input images, generate a feature pyramid for each of the plurality of input images, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for each of the plurality of input images based on the enhanced feature pyramid, generate instance information for each of the plurality of input images based on the enhanced feature pyramid, generate predicted panoptic segmentation information for each of the plurality of input images based on the semantic information and the instance information for each of the plurality of object regions, compare the predicted panoptic segmentation information to the panoptic segmentation information for each of the plurality of input images, and update the ANN based on the comparison.

A non-transitory computer readable medium storing code for training an ANN for panoptic segmentation is described. In some examples, the code comprises instructions executable by a processor to: identify training data comprising a plurality of input images and panoptic segmentation information for each of the plurality of input images, generate a feature pyramid for each of the plurality of input images, wherein the feature pyramid comprises a plurality of feature maps at different resolution levels, apply an attention module to the feature pyramid to produce an enhanced feature map, combine the enhanced feature map with each of the plurality of feature maps to produce an enhanced feature pyramid, generate semantic information for each of the plurality of input images based on the enhanced feature pyramid, generate instance information for each of the plurality of input images based on the enhanced feature pyramid, generate predicted panoptic segmentation information for each of the plurality of input images based on the semantic information and the instance information for each of the plurality of object regions, compare the predicted panoptic segmentation information to the panoptic segmentation information for each of the plurality of input images, and update the ANN based on the comparison.

Some examples of the method, apparatus, non-transitory computer readable medium, and system described above may further include generating a plurality of object regions based on the enhanced feature pyramid, wherein the instance information is generated for each of the plurality of object regions.

Some examples of the method, apparatus, non-transitory computer readable medium, and system described above may further include resizing each of the plurality of feature maps to a common resolution. Some examples may further include averaging each of the resized feature maps to produce a combined feature map, wherein the attention module is applied to the combined feature map. Some examples may further include resizing the enhanced feature map to each of the different resolution levels, wherein each of the plurality of feature maps is combined with the resized enhanced feature map at the corresponding different resolution level.

Some examples of the method, apparatus, non-transitory computer readable medium, and system described above may further include identifying a plurality of anchor points based on the enhanced feature pyramid. Some examples may further include performing an adaptive convolution on each of the plurality of anchor points to produce a plurality of refined anchor points. Some examples may further include generating a learned offset for each of the plurality of refined anchor points, wherein the learned offset is configured to align the refined anchor points and features of the input image. Some examples may further include applying a modulation mechanism to the refined anchor points and the corresponding learned offsets, wherein the plurality of object regions are based on the modulation mechanism.

Some examples of the method, apparatus, non-transitory computer readable medium, and system described above may further include applying a fully connected layer to each of the plurality of object regions. Some examples may further include applying a convolution layer to an output of the fully connected layer, wherein the instance information is based at least in part on an output of the convolution layer.

Some examples of the method, apparatus, non-transitory computer readable medium, and system described above may further include identifying classification confidence information for each of the object regions. Some examples may further include identifying IoU information for each of the object regions. Some examples may further include combining the classification confidence information and the IoU information to produce mask information for each of the object regions, wherein the instance information is based at least in part on the mask information.

Some examples of the method, apparatus, non-transitory computer readable medium, and system described above may further include applying a plurality of deformable convolutions to each level of the enhanced feature pyramid using a same convolution head. Some examples may further include upscaling an output of the convolution head. Some examples may further include concatenating the upscaled output of the convolution head. Some examples may further include applying an SE layer to the concatenated upscaled output of the convolution head, wherein the semantic information is based on an output of the SE layer.

An apparatus for panoptic segmentation is described. Embodiments of the apparatus may include a feature pyramid component comprising a feature pyramid network and an attention module, wherein the feature pyramid component is configured to produce an enhanced feature pyramid, an instance component comprising an region proposal network (RPN) and an instance head, wherein the instance component is configured to generate instance information based on the enhanced feature pyramid, and a semantic component configured to generate semantic information based on the enhanced feature pyramid.

A method of manufacturing an apparatus for panoptic segmentation is described. The method may include providing a feature pyramid component comprising a feature pyramid network and an attention module, wherein the feature pyramid component is configured to produce an enhanced feature pyramid, providing an instance component comprising an RPN and an instance head, wherein the instance component is configured to generate instance information based on the enhanced feature pyramid, and providing a semantic component configured to generate semantic information based on the enhanced feature pyramid.

A method of using an apparatus for panoptic segmentation is described. The method may include using a feature pyramid component comprising a feature pyramid network and an attention module to produce an enhanced feature pyramid, using an instance component comprising an RPN and an instance head to generate instance information based on the enhanced feature pyramid, and using a semantic component to generate semantic information based on the enhanced feature pyramid.

In some examples, the instance component further comprises an alignment component. In some examples, the instance component further comprises a double R-CNN head. In some examples, the instance component further comprises a mask head. In some examples, the instance component further comprises a mask IoU head. Some examples of the apparatus, system, and method described above may further include a plurality of deformable convolution layers. Some examples may further include an SE block. Some examples may further include a prediction layer.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ.

Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
generating a feature pyramid for an input image, wherein the feature pyramid comprises a plurality of feature maps at different resolution levels;
applying an attention module to the feature pyramid to produce an enhanced feature map;
combining the enhanced feature map with each of the plurality of feature maps to produce an enhanced feature pyramid;
generating semantic information for the input image based on the enhanced feature pyramid;
generating a plurality of object regions based on the enhanced feature pyramid;
generating instance information for each of the plurality of object regions; and
generating panoptic segmentation information for the input image based on the semantic information and the instance information for each of the plurality of object regions.

2. The method of claim 1, further comprising:
resizing each of the plurality of feature maps to a common resolution;
averaging each of the resized feature maps to produce a combined feature map, wherein the attention module is applied to the combined feature map; and
resizing the enhanced feature map to each of the different resolution levels, wherein each of the plurality of feature maps is combined with the resized enhanced feature map at the corresponding different resolution level.

3. The method of claim 2, further comprising:
identifying a relative position representation of the combined feature map, wherein the attention module is applied based on the relative position representation.

4. The method of claim 1, further comprising:
identifying a plurality of anchor points based on the enhanced feature pyramid;
performing an adaptive convolution on each of the plurality of anchor points to produce a plurality of refined anchor points;
generating a learned offset for each of the plurality of refined anchor points, wherein the learned offset is configured to align the refined anchor points and features of the input image; and
applying a modulation mechanism to the refined anchor points and the corresponding learned offsets, wherein the plurality of object regions are based on the modulation mechanism.

5. The method of claim 1, further comprising:
applying a fully connected layer to each of the plurality of object regions; and
applying a convolution layer to an output of the fully connected layer, wherein the instance information is based at least in part on an output of the convolution layer.

6. The method of claim 1, further comprising:
identifying classification confidence information for each of the object regions;
identifying intersection over union (IoU) information for each of the object regions; and
combining the classification confidence information and the IoU information to produce mask information for each of the object regions, wherein the instance information is based at least in part on the mask information.

7. The method of claim 1, further comprising:
apply a plurality of deformable convolutions to each level of the enhanced feature pyramid using a same convolution head;
upscaling an output of the convolution head;
concatenating the upscaled output of the convolution head; and
applying a squeeze-and-excitation (SE) layer to the concatenated upscaled output of the convolution head, wherein the semantic information is based on an output of the SE layer.

8. A method of training an artificial neural network (ANN) for image processing, comprising:
identifying training data comprising a plurality of input images and panoptic segmentation information for each of the plurality of input images;
generating a feature pyramid for each of the plurality of input images, wherein the feature pyramid comprises a plurality of feature maps at different resolution levels;
applying an attention module to the feature pyramid to produce an enhanced feature map;
combining the enhanced feature map with each of the plurality of feature maps to produce an enhanced feature pyramid;
generating semantic information for each of the plurality of input images based on the enhanced feature pyramid;
generating instance information for each of the plurality of input images based on the enhanced feature pyramid;
generating predicted panoptic segmentation information for each of the plurality of input images based on the semantic information and the instance information;
comparing the predicted panoptic segmentation information to the panoptic segmentation information for each of the plurality of input images; and
updating the artificial neural network (ANN) based on the comparison.

9. The method of claim 8, further comprising:
generating a plurality of object regions based on the enhanced feature pyramid, wherein the instance information is generated for each of the plurality of object regions.

10. The method of claim 8, further comprising:
resizing each of the plurality of feature maps to a common resolution;
averaging each of the resized feature maps to produce a combined feature map, wherein the attention module is applied to the combined feature map; and
resizing the enhanced feature map to each of the different resolution levels, wherein each of the plurality of feature maps is combined with the resized enhanced feature map at the corresponding different resolution level.

11. The method of claim 8, further comprising:
identifying a plurality of anchor points based on the enhanced feature pyramid;
performing an adaptive convolution on each of the plurality of anchor points to produce a plurality of refined anchor points;
generating a learned offset for each of the plurality of refined anchor points, wherein the learned offset is configured to align the refined anchor points and features of the input image; and applying a modulation mechanism to the refined anchor points and the corresponding learned offsets, wherein the plurality of object regions are based on the modulation mechanism.

12. The method of claim 8, further comprising:
applying a fully connected layer to each of the plurality of object regions; and
apply a convolution layer to an output of the fully connected layer, wherein the instance information is based at least in part on an output of the convolution layer.

13. The method of claim 8, further comprising:
identifying classification confidence information for each of the object regions;
identifying intersection over union (IoU) information for each of the object regions; and
combining the classification confidence information and the IoU information to produce mask information for each of the object regions, wherein the instance information is based at least in part on the mask information.

14. The method of claim 8, further comprising:
applying a plurality of deformable convolutions to each level of the enhanced feature pyramid using a same convolution head;
upscaling an output of the convolution head;
concatenating the upscaled output of the convolution head; and
applying a squeeze-and-excitation (SE) layer to the concatenated upscaled output of the convolution head, wherein the semantic information is based on an output of the SE layer.

15. An apparatus for image processing, comprising:
a feature pyramid component comprising a feature pyramid network and an attention module, wherein the feature pyramid component is configured to produce an enhanced feature pyramid by applying an attention module to a feature pyramid to produce an enhanced feature map and combining the enhanced feature map with each of a plurality of feature maps based on the attention module;
an instance component comprising a region proposal network (RPN) and an instance head, wherein the instance component is configured to generate a plurality of object regions and to generate instance information for each of the plurality of object regions based on the enhanced feature pyramid;
a semantic component configured to generate semantic information based on the enhanced feature pyramid; and
a panoptic segmentation component configured to generate panoptic segmentation information based on the instance information and the semantic information.

16. The apparatus of claim 15, wherein:
the instance component further comprises an alignment component.

17. The apparatus of claim 15, wherein:
the instance component further comprises a double region-based CNN (R-CNN) head.

18. The apparatus of claim 15, wherein:
the instance component further comprises a mask head.

19. The apparatus of claim 15, wherein:
the instance component further comprises a mask intersection over union (IoU) head.

20. The apparatus of claim 15, the semantic component further comprising:
a plurality of deformable convolution layers;
a squeeze-and-excitation (SE) block; and
a prediction layer.

* * * * *